United States Patent
Trisnadi et al.

(10) Patent No.: US 7,068,372 B1
(45) Date of Patent: Jun. 27, 2006

(54) MEMS INTERFEROMETER-BASED RECONFIGURABLE OPTICAL ADD-AND-DROP MULTIPLEXOR

(75) Inventors: Jahja I. Trisnadi, Cupertino, CA (US); Clinton B. Carlisle, Palo Alto, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 382 days.

(21) Appl. No.: 10/353,694

(22) Filed: Jan. 28, 2003

(51) Int. Cl.
*G01B 9/02* (2006.01)
(52) U.S. Cl. .................................................. 356/450
(58) Field of Classification Search .............. 356/450, 356/491
See application file for complete search history.

(56) References Cited

U.S. PATENT DOCUMENTS

| | | | |
|---|---|---|---|
| 1,525,550 A | 2/1925 | Jenkins | |
| 1,548,262 A | 8/1925 | Freedman | |
| RE16,767 E | 10/1927 | Jenkins | |
| 1,814,701 A | 7/1931 | Ives | |
| 2,415,226 A | 2/1947 | Sziklai | 178/5.4 |
| 2,783,406 A | 2/1957 | Vanderhooft | 313/70 |
| 2,920,529 A | 1/1960 | Blythe | 88/73 |
| 2,991,690 A | 7/1961 | Grey et al. | 88/16.6 |
| RE25,169 E | 5/1962 | Glenn | |
| 3,256,465 A | 6/1966 | Weissenstern et al. | 317/101 |
| 3,388,301 A | 6/1968 | James | 317/234 |
| 3,443,871 A | 5/1969 | Chitayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |

(Continued)

FOREIGN PATENT DOCUMENTS

DE 32 33 195 A1 3/1983

(Continued)

OTHER PUBLICATIONS

R. Apte, "Grating Light Valves for High Resolution Displays", Solid State Sensors and Actuators Workshop, Ph D. Dissertation, Stanford University (Jun. 1994).

(Continued)

*Primary Examiner*—Andrew H. Lee
(74) *Attorney, Agent, or Firm*—Okamoto & Benedicto LLP

(57) ABSTRACT

The interferometer comprises a beam splitter, a mirror and a phase modulator. The beam splitter splits a signal into a first portion and a second portion. The mirror reflects the first portion. The first portion includes an optical path length, which is fixed. The phase modulator includes a selectively actuated reflective element to reflect the second portion. The second portion includes an optical path length, which is variable. The reflective element is selectively actuated between a first position and a second position to vary the optical path length of the second portion. When the reflective element is in the first position, the first portion and the second portion constructively interfere thereby directing the component signal along a first output path. When the reflective element is in the second position, the first portion and the second portion destructively interfere thereby directing the component signal along a second optical path. An array of interferometers combined with polarization diversity micro-optics module, static diffraction grating, and simple free-space optics is used for selectively passing and dropping first component signals of a first wavelength division multiplexed (WDM) signal and for selectively adding second component signals of a second WDM signal to the first WDM signal.

8 Claims, 8 Drawing Sheets

U.S. PATENT DOCUMENTS

| | | | |
|---|---|---|---|
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,185 A | 5/1974 | Larnerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/59 |
| 4,103,273 A | 7/1978 | Keller | 338/2 |
| 4,126,380 A | 11/1978 | Borm | 350/255 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 356/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,011 A | 12/1985 | Kohara et al. | |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PM |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |

| | | | | | | |
|---|---|---|---|---|---|---|
| 4,711,526 A | 12/1987 | Hennings et al. ............ 350/170 | | 5,028,939 A | 7/1991 | Hornbeck et al. .......... 346/160 |
| 4,714,326 A | 12/1987 | Usui et al. ................... 350/485 | | 5,031,144 A | 7/1991 | Persky |
| 4,717,066 A | 1/1988 | Goldenberg et al. ......... 228/179 | | 5,035,473 A | 7/1991 | Kuwayama et al. .......... 350/3.7 |
| 4,719,507 A | 1/1988 | Bos .............................. 358/92 | | 5,037,173 A | 8/1991 | Sampsell et al. .............. 385/17 |
| 4,721,629 A | 1/1988 | Sakai et al. ................... 427/35 | | 5,039,628 A | 8/1991 | Carey .......................... 437/183 |
| 4,722,593 A | 2/1988 | Shimazaki ................... 350/336 | | 5,040,052 A | 8/1991 | McDavid ...................... 357/80 |
| 4,724,467 A | 2/1988 | Yip et al. ...................... 355/71 | | 5,041,395 A | 8/1991 | Steffen ......................... 437/206 |
| 4,728,185 A | 3/1988 | Thomas ....................... 353/122 | | 5,041,851 A | 8/1991 | Nelson ........................ 346/160 |
| 4,743,091 A | 5/1988 | Gelbart ....................... 350/252 | | 5,043,917 A | 8/1991 | Okamoto ..................... 364/518 |
| 4,744,618 A * | 5/1988 | Mahlein ....................... 385/37 | | 5,048,077 A | 9/1991 | Wells et al. ................... 379/96 |
| 4,744,633 A | 5/1988 | Sheiman ..................... 350/132 | | 5,049,901 A | 9/1991 | Gelbart ....................... 346/108 |
| 4,747,671 A | 5/1988 | Takahashi et al. ........... 350/336 | | 5,058,992 A | 10/1991 | Takahashi ................... 359/567 |
| 4,751,509 A | 6/1988 | Kubota et al. ............... 340/784 | | 5,060,058 A | 10/1991 | Goldenberg et al. ........... 358/60 |
| 4,761,253 A | 8/1988 | Antes ........................ 264/1.3 | | 5,061,049 A | 10/1991 | Hornbeck .................... 359/224 |
| 4,763,975 A | 8/1988 | Scifres et al. ............. 350/96.15 | | 5,066,614 A | 11/1991 | Dunnaway et al. .......... 437/209 |
| 4,765,865 A | 8/1988 | Gealer et al. ................ 156/647 | | 5,068,205 A | 11/1991 | Baxter et al. ................ 437/205 |
| 4,772,094 A | 9/1988 | Sheiman ..................... 350/133 | | 5,072,239 A | 12/1991 | Mitcham et al. ............. 346/108 |
| 4,797,694 A | 1/1989 | Agostinelli et al. .......... 346/160 | | 5,072,418 A | 12/1991 | Boutaud et al. ........ 364/715.06 |
| 4,797,918 A | 1/1989 | Lee et al. ...................... 380/20 | | 5,074,947 A | 12/1991 | Estes et al. .............. 156/307.3 |
| 4,801,194 A | 1/1989 | Agostinelli et al. .......... 350/356 | | 5,075,940 A | 12/1991 | Kuriyama et al. .......... 29/25.03 |
| 4,803,560 A | 2/1989 | Matsunaga et al. .......... 359/236 | | 5,079,544 A | 1/1992 | DeMond et al. ............. 340/701 |
| 4,804,641 A | 2/1989 | Arlt et al. .................... 437/227 | | 5,081,617 A | 1/1992 | Gelbart ....................... 369/112 |
| 4,807,021 A | 2/1989 | Okumura ...................... 357/75 | | 5,083,857 A | 1/1992 | Hornbeck .................... 359/291 |
| 4,807,965 A | 2/1989 | Garakani ..................... 350/131 | | 5,085,497 A | 2/1992 | Um et al. ..................... 359/848 |
| 4,809,078 A | 2/1989 | Yabe et al. ................... 358/236 | | 5,089,903 A | 2/1992 | Kuwayama et al. ............ 359/15 |
| 4,811,082 A | 3/1989 | Jacobs et al. .................. 357/80 | | 5,093,281 A | 3/1992 | Eshima ........................ 437/217 |
| 4,811,210 A | 3/1989 | McAulay ..................... 364/200 | | 5,096,279 A | 3/1992 | Hornbeck et al. ........... 359/230 |
| 4,814,759 A | 3/1989 | Gombrich et al. ........... 340/771 | | 5,099,353 A | 3/1992 | Hornbeck .................... 359/291 |
| 4,817,850 A | 4/1989 | Wiener-Avnear et al. ... 228/119 | | 5,101,184 A | 3/1992 | Antes ........................ 235/454 |
| 4,824,200 A | 4/1989 | Isono et al. ............... 350/96.16 | | 5,101,236 A | 3/1992 | Nelson et al. ............... 355/229 |
| 4,827,391 A | 5/1989 | Sills ............................ 363/41 | | 5,103,334 A | 4/1992 | Swanberg .................... 359/197 |
| 4,829,365 A | 5/1989 | Eichenlaub ..................... 358/3 | | 5,105,207 A | 4/1992 | Nelson ........................ 346/160 |
| 4,836,649 A | 6/1989 | Ledebuhr et al. ........ 350/331 R | | 5,105,299 A | 4/1992 | Anderson et al. ........... 359/223 |
| 4,856,863 A | 8/1989 | Sampsell et al. ......... 350/96.16 | | 5,105,369 A | 4/1992 | Nelson ........................ 364/525 |
| 4,856,869 A | 8/1989 | Sakata et al. ........... 350/162.18 | | 5,107,372 A | 4/1992 | Gelbart et al. .............. 359/824 |
| 4,859,012 A | 8/1989 | Cohn ....................... 350/96.24 | | 5,112,436 A | 5/1992 | Bol ............................. 156/643 |
| 4,859,060 A | 8/1989 | Katagiri et al. .............. 356/352 | | 5,113,272 A | 5/1992 | Reamey ........................ 359/53 |
| 4,866,488 A | 9/1989 | Frensley ........................ 357/4 | | 5,113,285 A | 5/1992 | Franklin et al. ............. 359/465 |
| 4,882,683 A | 11/1989 | Rupp et al. .................. 364/521 | | 5,115,344 A | 5/1992 | Jaskie ......................... 359/573 |
| 4,893,509 A | 1/1990 | MacIver et al. ......... 73/517 AV | | 5,119,204 A | 6/1992 | Hashimoto et al. ......... 358/254 |
| 4,896,325 A | 1/1990 | Coldren ...................... 372/20 | | 5,121,343 A | 6/1992 | Faris .......................... 395/111 |
| 4,896,948 A | 1/1990 | Dono et al. ................. 350/355 | | 5,126,812 A | 6/1992 | Greiff .......................... 357/25 |
| 4,897,708 A | 1/1990 | Clements ...................... 357/65 | | 5,126,826 A | 6/1992 | Kauchi et al. ................. 357/72 |
| 4,902,083 A | 2/1990 | Wells ......................... 350/6.6 | | 5,126,836 A | 6/1992 | Um ............................. 358/60 |
| 4,915,463 A | 4/1990 | Barbee, Jr. ................... 350/1.1 | | 5,128,660 A | 7/1992 | DeMond et al. ............. 340/707 |
| 4,915,479 A | 4/1990 | Clarke ........................ 350/345 | | 5,129,716 A | 7/1992 | Holakovszky et al. ........ 351/50 |
| 4,924,413 A | 5/1990 | Suwannukul ................ 364/521 | | 5,132,723 A | 7/1992 | Gelbart ......................... 355/40 |
| 4,926,241 A | 5/1990 | Carey ......................... 357/75 | | 5,132,812 A | 7/1992 | Takahashi et al. .............. 359/9 |
| 4,930,043 A | 5/1990 | Wiegand ..................... 361/283 | | 5,136,695 A | 8/1992 | Goldshlag et al. .......... 395/275 |
| 4,934,773 A | 6/1990 | Becker ........................ 350/6.6 | | 5,137,836 A | 8/1992 | Lam ............................ 437/8 |
| 4,940,309 A | 7/1990 | Baum .......................... 350/1.1 | | 5,142,303 A | 8/1992 | Nelson ........................ 346/108 |
| 4,943,815 A | 7/1990 | Aldrich et al. .............. 346/108 | | 5,142,405 A | 8/1992 | Hornbeck .................... 359/226 |
| 4,945,773 A | 8/1990 | Sickafus .................... 73/862.59 | | 5,142,677 A | 8/1992 | Ehlig et al. .................. 395/650 |
| 4,949,148 A | 8/1990 | Bartelink ...................... 357/74 | | 5,144,472 A | 9/1992 | Sang, Jr. et al. ............. 359/254 |
| 4,950,890 A | 8/1990 | Gelbart ................... 250/237 G | | 5,147,815 A | 9/1992 | Casto .......................... 437/51 |
| 4,952,925 A | 8/1990 | Haastert ...................... 340/784 | | 5,148,157 A | 9/1992 | Florence ..................... 340/783 |
| 4,954,789 A | 9/1990 | Sampsell ..................... 330/4.3 | | 5,148,506 A | 9/1992 | McDonald .................... 385/16 |
| 4,956,619 A | 9/1990 | Hornbeck .................... 330/4.3 | | 5,149,405 A | 9/1992 | Bruns et al. .............. 204/129.1 |
| 4,961,633 A | 10/1990 | Ibrahim et al. .............. 350/392 | | 5,150,205 A | 9/1992 | Um et al. ..................... 358/60 |
| 4,963,012 A | 10/1990 | Tracy et al. .................. 350/641 | | 5,151,718 A | 9/1992 | Nelson ........................ 346/160 |
| 4,970,575 A | 11/1990 | Soga et al. .................... 357/72 | | 5,151,724 A | 9/1992 | Kikinis ........................ 357/17 |
| 4,978,202 A | 12/1990 | Yang ...................... 350/331 R | | 5,151,763 A | 9/1992 | Marek et al. .................. 357/26 |
| 4,982,184 A | 1/1991 | Kirkwood ................... 340/783 | | 5,153,770 A | 10/1992 | Harris ......................... 359/245 |
| 4,982,265 A | 1/1991 | Watanabe et al. ............. 357/75 | | 5,155,604 A | 10/1992 | Miekka et al. ................. 359/2 |
| 4,984,824 A | 1/1991 | Antes et al. .................. 283/91 | | 5,155,615 A | 10/1992 | Tagawa ....................... 359/213 |
| 4,999,308 A | 3/1991 | Nishiura et al. ................ 437/4 | | 5,155,778 A | 10/1992 | Magel et al. ................... 385/18 |
| 5,003,300 A | 3/1991 | Wells .......................... 340/705 | | 5,155,812 A | 10/1992 | Ehlig et al. .................. 395/275 |
| 5,009,473 A | 4/1991 | Hunter et al. ................ 350/6.6 | | 5,157,304 A | 10/1992 | Kane et al. .................. 313/495 |
| 5,013,141 A | 5/1991 | Sakata ........................ 350/348 | | 5,159,485 A | 10/1992 | Nelson ........................ 359/291 |
| 5,018,256 A | 5/1991 | Hornbeck ................... 29/25.01 | | 5,161,042 A | 11/1992 | Hamada ....................... 359/41 |
| 5,022,750 A | 6/1991 | Flasck ......................... 353/31 | | 5,162,787 A | 11/1992 | Thompson et al. .......... 340/794 |
| 5,023,905 A | 6/1991 | Wells et al. ................... 379/96 | | 5,164,019 A | 11/1992 | Sinton ........................ 136/249 |
| 5,024,494 A | 6/1991 | Williams et al. .............. 350/3.6 | | 5,165,013 A | 11/1992 | Faris ........................... 395/104 |

| Patent | Date | Inventor | Ref |
|---|---|---|---|
| 5,168,401 A | 12/1992 | Endriz | 359/625 |
| 5,168,406 A | 12/1992 | Nelson | 359/855 |
| 5,170,156 A | 12/1992 | DeMond et al. | 340/794 |
| 5,170,269 A | 12/1992 | Lin et al. | 359/9 |
| 5,170,283 A | 12/1992 | O'Brien et al. | 359/291 |
| 5,172,161 A | 12/1992 | Nelson | 355/200 |
| 5,172,262 A | 12/1992 | Hornbeck | 359/223 |
| 5,177,724 A | 1/1993 | Gelbart | 369/44.16 |
| 5,178,728 A | 1/1993 | Boysel et al. | 156/656 |
| 5,179,274 A | 1/1993 | Sampsell | 250/208.2 |
| 5,179,367 A | 1/1993 | Shimizu | 340/700 |
| 5,181,231 A | 1/1993 | Parikh et al. | 377/26 |
| 5,182,665 A | 1/1993 | O'Callaghan et al. | 359/95 |
| 5,185,660 A | 2/1993 | Um | 358/60 |
| 5,185,823 A | 2/1993 | Kaku et al. | |
| 5,188,280 A | 2/1993 | Nakao et al. | 228/123 |
| 5,189,404 A | 2/1993 | Masimo et al. | 340/720 |
| 5,189,505 A | 2/1993 | Bartelink | 257/419 |
| 5,191,405 A | 3/1993 | Tomita et al. | 257/777 |
| 5,192,864 A | 3/1993 | McEwen et al. | 250/234 |
| 5,192,946 A | 3/1993 | Thompson et al. | 340/794 |
| 5,198,895 A | 3/1993 | Vick | 358/103 |
| D334,557 S | 4/1993 | Hunter et al. | D14/114 |
| D334,742 S | 4/1993 | Hunter et al. | D14/113 |
| 5,202,785 A | 4/1993 | Nelson | 359/214 |
| 5,206,629 A | 4/1993 | DeMond et al. | 340/719 |
| 5,206,829 A | 4/1993 | Thakoor et al. | |
| 5,208,818 A | 5/1993 | Gelbart et al. | 372/30 |
| 5,208,891 A | 5/1993 | Prysner | 385/116 |
| 5,210,637 A | 5/1993 | Puzey | 359/263 |
| 5,212,115 A | 5/1993 | Cho et al. | 437/208 |
| 5,212,555 A | 5/1993 | Stoltz | 358/206 |
| 5,212,582 A | 5/1993 | Nelson | 359/224 |
| 5,214,308 A | 5/1993 | Nishiguchi et al. | 257/692 |
| 5,214,419 A | 5/1993 | DeMond et al. | 340/794 |
| 5,214,420 A | 5/1993 | Thompson et al. | 340/795 |
| 5,216,278 A | 6/1993 | Lin et al. | |
| 5,216,537 A | 6/1993 | Hornbeck | 359/291 |
| 5,216,544 A | 6/1993 | Horikawa et al. | 359/622 |
| 5,219,794 A | 6/1993 | Satoh et al. | 437/209 |
| 5,220,200 A | 6/1993 | Blanton | 257/778 |
| 5,221,400 A | 6/1993 | Staller et al. | 156/292 |
| 5,221,982 A | 6/1993 | Faris | 359/93 |
| 5,224,088 A | 6/1993 | Atiya | 369/97 |
| D337,320 S | 7/1993 | Hunter et al. | D14/113 |
| 5,226,099 A | 7/1993 | Mignardi et al. | 385/19 |
| 5,229,597 A | 7/1993 | Fukatsu | |
| 5,230,005 A | 7/1993 | Rubino et al. | 372/20 |
| 5,231,363 A | 7/1993 | Sano et al. | 332/109 |
| 5,231,388 A | 7/1993 | Stoltz | 340/783 |
| 5,231,432 A | 7/1993 | Glenn | 353/31 |
| 5,233,456 A | 8/1993 | Nelson | 359/214 |
| 5,233,460 A | 8/1993 | Partlo et al. | 359/247 |
| 5,233,874 A | 8/1993 | Putty et al. | 73/517 AV |
| 5,237,340 A | 8/1993 | Nelson | 346/108 |
| 5,237,435 A | 8/1993 | Kurematsu et al. | 359/41 |
| 5,239,448 A | 8/1993 | Perkins et al. | 361/764 |
| 5,239,806 A | 8/1993 | Maslakow | 53/432 |
| 5,240,818 A | 8/1993 | Mignardi et al. | 430/321 |
| 5,245,686 A | 9/1993 | Faris et al. | 385/120 |
| 5,247,180 A | 9/1993 | Mitcham et al. | 250/492.1 |
| 5,247,593 A | 9/1993 | Lin et al. | 385/17 |
| 5,249,245 A | 9/1993 | Lebby et al. | 385/89 |
| 5,251,057 A | 10/1993 | Guerin et al. | 359/249 |
| 5,251,058 A | 10/1993 | MacArthur | 359/249 |
| 5,254,980 A | 10/1993 | Hendrix et al. | 345/84 |
| 5,255,100 A | 10/1993 | Urbanus | 358/231 |
| 5,256,869 A | 10/1993 | Lin et al. | 250/201.9 |
| 5,258,325 A | 11/1993 | Spitzer et al. | 437/86 |
| 5,260,718 A | 11/1993 | Rommelmann et al. | 346/107 R |
| 5,260,798 A | 11/1993 | Um et al. | 358/233 |
| 5,262,000 A | 11/1993 | Welbourn et al. | 156/643 |
| 5,272,473 A | 12/1993 | Thompson et al. | 345/7 |
| 5,278,652 A | 1/1994 | Urbanus et al. | 358/160 |
| 5,278,925 A | 1/1994 | Boysel et al. | 385/14 |
| 5,280,277 A | 1/1994 | Hornbeck | 345/108 |
| 5,281,887 A | 1/1994 | Engle | 310/335 |
| 5,281,957 A | 1/1994 | Schoolman | 345/8 |
| 5,285,105 A | 2/1994 | Cain | 257/672 |
| 5,285,196 A | 2/1994 | Gale, Jr. | 345/108 |
| 5,285,407 A | 2/1994 | Gale et al. | 365/189.11 |
| 5,287,096 A | 2/1994 | Thompson et al. | 345/147 |
| 5,287,215 A | 2/1994 | Warde et al. | 359/293 |
| 5,289,172 A | 2/1994 | Gale, Jr. et al. | 345/108 |
| 5,291,317 A | 3/1994 | Newswanger | 359/15 |
| 5,291,473 A | 3/1994 | Pauli | 369/112 |
| 5,293,511 A | 3/1994 | Poradish et al. | 257/434 |
| 5,296,408 A | 3/1994 | Wilbarg et al. | 437/203 |
| 5,296,891 A | 3/1994 | Vogt et al. | 355/67 |
| 5,296,950 A | 3/1994 | Lin et al. | 359/9 |
| 5,298,460 A | 3/1994 | Nishiguchi et al. | 437/183 |
| 5,299,037 A | 3/1994 | Sakata | 359/41 |
| 5,299,289 A | 3/1994 | Omae et al. | 359/95 |
| 5,300,813 A | 4/1994 | Joshi et al. | 257/752 |
| 5,301,062 A | 4/1994 | Takahashi et al. | 359/567 |
| 5,303,043 A | 4/1994 | Glenn | 348/40 |
| 5,303,055 A | 4/1994 | Hendrix et al. | 348/761 |
| 5,307,056 A | 4/1994 | Urbanus | 340/189 |
| 5,307,185 A | 4/1994 | Jones et al. | 359/41 |
| 5,310,624 A | 5/1994 | Ehrlich | 430/322 |
| 5,311,349 A | 5/1994 | Anderson et al. | 359/223 |
| 5,311,360 A | 5/1994 | Bloom et al. | 359/572 |
| 5,312,513 A | 5/1994 | Florence et al. | 156/643 |
| 5,313,479 A | 5/1994 | Florence | 372/26 |
| 5,313,648 A | 5/1994 | Ehlig et al. | 395/800 |
| 5,313,835 A | 5/1994 | Dunn | 73/505 |
| 5,315,418 A | 5/1994 | Sprague et al. | 359/41 |
| 5,315,423 A | 5/1994 | Hong | 359/124 |
| 5,315,429 A | 5/1994 | Abramov | |
| 5,319,214 A | 6/1994 | Gregory et al. | 250/504 R |
| 5,319,668 A | 6/1994 | Luecke | 372/107 |
| 5,319,789 A | 6/1994 | Ehlig et al. | 395/800 |
| 5,319,792 A | 6/1994 | Ehlig et al. | 395/800 |
| 5,320,709 A | 6/1994 | Bowden et al. | |
| 5,321,416 A | 6/1994 | Bassett et al. | 345/8 |
| 5,323,002 A | 6/1994 | Sampsell et al. | 250/252.1 |
| 5,323,051 A | 6/1994 | Adams et al. | 257/417 |
| 5,325,116 A | 6/1994 | Sampsell | 346/108 |
| 5,327,286 A | 7/1994 | Sampsell et al. | 359/561 |
| 5,329,289 A | 7/1994 | Sakamoto et al. | 345/126 |
| 5,330,301 A | 7/1994 | Brancher | 414/417 |
| 5,330,878 A | 7/1994 | Nelson | 430/311 |
| 5,331,454 A | 7/1994 | Hornbeck | 359/224 |
| 5,334,991 A | 8/1994 | Wells et al. | 345/8 |
| 5,339,116 A | 8/1994 | Urbanus et al. | 348/716 |
| 5,339,177 A | 8/1994 | Jenkins et al. | 359/35 |
| 5,340,772 A | 8/1994 | Rosotker | 437/226 |
| 5,345,521 A | 9/1994 | McDonald et al. | 385/19 |
| 5,347,321 A | 9/1994 | Gove | 348/663 |
| 5,347,378 A | 9/1994 | Handschy et al. | 359/53 |
| 5,347,433 A | 9/1994 | Sedlmayr | 362/32 |
| 5,348,619 A | 9/1994 | Bohannon et al. | 156/664 |
| 5,349,687 A | 9/1994 | Ehlig et al. | 395/800 |
| 5,351,052 A | 9/1994 | O'Hont et al. | 342/42 |
| 5,352,926 A | 10/1994 | Andrews | 257/717 |
| 5,354,416 A | 10/1994 | Okudaira et al. | 156/643 |
| 5,357,369 A | 10/1994 | Pilling et al. | 359/462 |
| 5,357,803 A | 10/1994 | Lane | 73/517 B |
| 5,359,349 A | 10/1994 | Jambor et al. | 345/168 |
| 5,359,451 A | 10/1994 | Gelbart et al. | 359/285 |
| 5,361,131 A | 11/1994 | Tekemori et al. | 356/355 |
| 5,363,220 A | 11/1994 | Kuwayama et al. | 359/3 |
| 5,365,283 A | 11/1994 | Doherty et al. | 348/743 |
| 5,367,585 A | 11/1994 | Ghezzo et al. | 385/23 |
| 5,370,742 A | 12/1994 | Mitchell et al. | 134/10 |
| 5,371,543 A | 12/1994 | Anderson | 348/270 |

| | | | |
|---|---|---|---|
| 5,371,618 A | 12/1994 | Tai et al. ................... 359/53 |
| 5,377,705 A | 1/1995 | Smith, Jr. et al. .......... 134/95.3 |
| 5,382,961 A | 1/1995 | Gale, Jr. ...................... 345/108 |
| 5,387,924 A | 2/1995 | Gale, Jr. et al. ............ 345/108 |
| 5,389,182 A | 2/1995 | Mignardi .................... 156/344 |
| 5,391,881 A | 2/1995 | Jeuch et al. ........... 250/370.09 |
| 5,392,140 A | 2/1995 | Ezra et al. ................... 359/41 |
| 5,392,151 A | 2/1995 | Nelson ........................ 359/223 |
| 5,394,303 A | 2/1995 | Yamaji ........................ 361/749 |
| 5,398,071 A | 3/1995 | Gove et al. ................. 348/558 |
| 5,399,898 A | 3/1995 | Rostoker ..................... 257/499 |
| 5,404,365 A | 4/1995 | Hiiro ........................... 372/27 |
| 5,404,485 A | 4/1995 | Ban .............................. 395/425 |
| 5,408,123 A | 4/1995 | Murai .......................... 257/531 |
| 5,410,315 A | 4/1995 | Huber .......................... 342/42 |
| 5,411,769 A | 5/1995 | Hornbeck .................... 427/534 |
| 5,412,186 A | 5/1995 | Gale ............................. 219/1 2679 |
| 5,412,501 A | 5/1995 | Fisli ............................. 359/286 |
| 5,418,584 A | 5/1995 | Larson ......................... 353/122 |
| 5,420,655 A | 5/1995 | Shimizu ...................... 353/33 |
| 5,420,722 A | 5/1995 | Bielak .......................... 359/708 |
| 5,426,072 A | 6/1995 | Finnila ......................... 437/208 |
| 5,427,975 A | 6/1995 | Sparks et al. ................ 437/79 |
| 5,430,524 A | 7/1995 | Nelson ......................... 355/200 |
| 5,435,876 A | 7/1995 | Alfaro et al. ................ 156/247 |
| 5,438,477 A | 8/1995 | Pasch ........................... 361/689 |
| 5,439,731 A | 8/1995 | Li et al. ....................... 428/209 |
| 5,442,411 A | 8/1995 | Urbanus et al. ............. 348/771 |
| 5,442,414 A | 8/1995 | Janssen et al. ............... 353/98 |
| 5,444,566 A | 8/1995 | Gale et al. ................... 359/291 |
| 5,445,559 A | 8/1995 | Gale et al. ................... 451/388 |
| 5,446,479 A | 8/1995 | Thompson et al. .......... 345/139 |
| 5,447,600 A | 9/1995 | Webb ............................ 216/2 |
| 5,448,314 A | 9/1995 | Heimbuch et al. .......... 348/743 |
| 5,448,546 A | 9/1995 | Pauli ............................ 369/112 |
| 5,450,088 A | 9/1995 | Meier et al. ................. 342/51 |
| 5,450,219 A | 9/1995 | Gold et al. ................... 359/40 |
| 5,451,103 A | 9/1995 | Hatanaka et al. ............ 353/31 |
| 5,452,024 A | 9/1995 | Sampsell ...................... 348/755 |
| 5,452,138 A | 9/1995 | Mignardi et al. ............ 359/855 |
| 5,453,747 A | 9/1995 | D'Hont et al. ............... 342/42 |
| 5,453,778 A | 9/1995 | Venkateswar et al. ....... 347/239 |
| 5,453,803 A | 9/1995 | Shapiro et al. .............. 353/119 |
| 5,454,160 A | 10/1995 | Nickel .......................... 29/840 |
| 5,454,906 A | 10/1995 | Baker et al. .................. 216/66 |
| 5,455,445 A | 10/1995 | Kurtz et al. .................. 257/419 |
| 5,455,455 A | 10/1995 | Badehi ......................... 257/690 |
| 5,455,602 A | 10/1995 | Tew .............................. 347/239 |
| 5,457,493 A | 10/1995 | Leddy et al. ................. 348/164 |
| 5,457,566 A | 10/1995 | Sampsell et al. ............. 359/292 |
| 5,457,567 A | 10/1995 | Shinohara .................... 359/305 |
| 5,458,716 A | 10/1995 | Alfaro et al. ................ 156/245 |
| 5,459,492 A | 10/1995 | Venkateswar ................ 347/253 |
| 5,459,528 A | 10/1995 | Pettitt .......................... 348/568 |
| 5,459,592 A | 10/1995 | Shibatani et al. ............ 359/40 |
| 5,459,610 A | 10/1995 | Bloom et al. ................ 359/572 |
| 5,461,197 A | 10/1995 | Hiruta et al. ................. 174/52.4 |
| 5,461,410 A | 10/1995 | Venkateswar et al. ....... 347/240 |
| 5,461,411 A | 10/1995 | Florence et al. ............. 347/240 |
| 5,461,547 A | 10/1995 | Ciupke et al. ................ 362/31 |
| 5,463,347 A | 10/1995 | Jones et al. .................. 330/253 |
| 5,463,497 A | 10/1995 | Muraki et al. ............... 359/618 |
| 5,465,175 A | 11/1995 | Woodgate et al. ........... 359/463 |
| 5,467,106 A | 11/1995 | Salomon ...................... 345/87 |
| 5,467,138 A | 11/1995 | Gove ............................ 348/452 |
| 5,467,146 A | 11/1995 | Huang et al. ................. 348/743 |
| 5,469,302 A | 11/1995 | Lim .............................. 359/846 |
| 5,471,341 A | 11/1995 | Warde et al. ................. 359/293 |
| 5,473,512 A | 12/1995 | Degani et al. ................ 361/760 |
| 5,475,236 A | 12/1995 | Yoshizaki ..................... 257/48 |
| 5,480,839 A | 1/1996 | Ezawa et al. ................. 437/209 |
| 5,481,118 A | 1/1996 | Tew .............................. 250/551 |
| 5,481,133 A | 1/1996 | Hsu .............................. 257/621 |
| 5,482,564 A | 1/1996 | Douglas et al. .............. 134/18 |
| 5,482,818 A | 1/1996 | Nelson ......................... 430/394 |
| 5,483,307 A | 1/1996 | Anderson ..................... 353/98 |
| 5,485,172 A | 1/1996 | Sawachika et al. .......... 345/8 |
| 5,485,304 A | 1/1996 | Kaeriyama ................... 359/291 |
| 5,485,354 A | 1/1996 | Ciupke et al. ................ 362/31 |
| 5,486,698 A | 1/1996 | Hanson et al. ............... 250/332 |
| 5,486,841 A | 1/1996 | Hara et al. .................... 345/8 |
| 5,486,946 A | 1/1996 | Jachimowicz et al. ....... 359/263 |
| 5,488,431 A | 1/1996 | Gove et al. ................... 348/716 |
| 5,489,952 A | 2/1996 | Gove et al. ................... 348/771 |
| 5,490,009 A | 2/1996 | Venkateswar et al. ....... 359/291 |
| 5,491,510 A | 2/1996 | Gove ........................... 348/77 |
| 5,491,612 A | 2/1996 | Nicewarner, Jr. ........... 361/760 |
| 5,491,715 A | 2/1996 | Flaxl ........................... 375/344 |
| 5,493,177 A | 2/1996 | Muller et al. ................ 313/578 |
| 5,493,439 A | 2/1996 | Engle ........................... 359/292 |
| 5,497,172 A | 3/1996 | Doherty et al. .............. 345/85 |
| 5,497,197 A | 3/1996 | Gove et al. ................... 348/368 |
| 5,497,262 A | 3/1996 | Kaeriyama ................... 359/223 |
| 5,499,060 A | 3/1996 | Gove et al. ................... 348/651 |
| 5,499,062 A | 3/1996 | Urbanus ....................... 348/771 |
| 5,500,761 A | 3/1996 | Goossen et al. .............. 359/290 |
| 5,502,481 A | 3/1996 | Dentinger et al. ............ 348/51 |
| 5,504,504 A | 4/1996 | Markandey et al. ......... 345/214 |
| 5,504,514 A | 4/1996 | Nelson ......................... 347/130 |
| 5,504,575 A | 4/1996 | Stafford ....................... 356/330 |
| 5,504,614 A | 4/1996 | Webb et al. .................. 359/223 |
| 5,506,171 A | 4/1996 | Leonard et al. .............. 437/167 |
| 5,506,597 A | 4/1996 | Thompson et al. .......... 345/85 |
| 5,506,720 A | 4/1996 | Yoon ............................ 359/224 |
| 5,508,558 A | 4/1996 | Robinette, Jr. et al. ...... 257/700 |
| 5,508,561 A | 4/1996 | Tago et al. ................... 257/737 |
| 5,508,565 A | 4/1996 | Hatakeyama et al. ........ 257/777 |
| 5,508,750 A | 4/1996 | Hewlett et al. .............. 348/558 |
| 5,508,840 A | 4/1996 | Vogel et al. .................. 359/291 |
| 5,508,841 A | 4/1996 | Lin et al. ..................... 359/318 |
| 5,510,758 A | 4/1996 | Fujita et al. .................. 333/247 |
| 5,510,824 A | 4/1996 | Nelson ......................... 347/239 |
| 5,512,374 A | 4/1996 | Wallace et al. .............. 428/422 |
| 5,512,748 A | 4/1996 | Hanson ........................ 250/332 |
| 5,515,076 A | 5/1996 | Thompson et al. .......... 345/139 |
| 5,516,125 A | 5/1996 | McKenna ..................... 279/3 |
| 5,517,340 A | 5/1996 | Doany et al. ................. 359/41 |
| 5,517,347 A | 5/1996 | Sampsell ...................... 359/224 |
| 5,517,357 A | 5/1996 | Shibayama ................... 359/547 |
| 5,517,359 A | 5/1996 | Gelbart ........................ 359/623 |
| 5,519,251 A | 5/1996 | Sato et al. .................... 257/666 |
| 5,519,450 A | 5/1996 | Urbanus et al. ............. 348/600 |
| 5,521,748 A | 5/1996 | Sarraf .......................... 359/321 |
| 5,523,619 A | 6/1996 | McAllister et al. .......... 257/686 |
| 5,523,628 A | 6/1996 | Williams et al. ............. 257/777 |
| 5,523,803 A | 6/1996 | Urbanus et al. ............. 348/771 |
| 5,523,878 A | 6/1996 | Wallace et al. .............. 359/290 |
| 5,523,881 A | 6/1996 | Florence et al. ............. 359/561 |
| 5,523,920 A | 6/1996 | Machuga et al. ............. 361/767 |
| 5,524,155 A | 6/1996 | Weaver ........................ 385/24 |
| 5,526,834 A | 6/1996 | Mielnik et al. ............... 134/105 |
| 5,534,107 A | 7/1996 | Gray et al. ................... 156/643.1 |
| 5,534,883 A | 7/1996 | Koh ............................. 345/3 |
| 5,539,422 A | 7/1996 | Heacock et al. ............. 345/8 |
| 5,544,306 A | 8/1996 | Deering et al. .............. 395/164 |
| 5,552,635 A | 9/1996 | Kim et al. |
| 5,554,304 A | 9/1996 | Suzuki .......................... 216/2 |
| 5,576,878 A | 11/1996 | Henck .......................... 359/224 |
| 5,602,671 A | 2/1997 | Hornbeck ..................... 359/224 |
| 5,606,181 A | 2/1997 | Sakuma et al. ............... 257/88 |
| 5,606,447 A | 2/1997 | Asada et al. .................. 359/199 |
| 5,610,438 A | 3/1997 | Wallace et al. .............. 357/682 |
| 5,623,361 A | 4/1997 | Engle ........................... 359/291 |
| 5,629,566 A | 5/1997 | Doi et al. ..................... 257/789 |
| 5,629,801 A | 5/1997 | Staker et al. ................. 359/572 |
| 5,640,216 A | 6/1997 | Hasegawa et al. ........... 349/58 |

| | | | |
|---|---|---|---|
| 5,658,698 A | 8/1997 | Yagi et al. ............... 430/11 |
| 5,661,592 A | 8/1997 | Bornstein et al. ........ 359/291 |
| 5,661,593 A | 8/1997 | Engle ....................... 359/292 |
| 5,663,817 A | 9/1997 | Frapin et al. ............... 349/5 |
| 5,668,611 A | 9/1997 | Ernstoff et al. ........... 348/771 |
| 5,673,139 A | 9/1997 | Johnson .................. 359/291 |
| 5,677,783 A | 10/1997 | Bloom et al. ............ 359/224 |
| 5,689,361 A | 11/1997 | Damen et al. ........... 359/284 |
| 5,691,836 A | 11/1997 | Clark ...................... 359/247 |
| 5,694,740 A | 12/1997 | Martin et al. .............. 53/431 |
| 5,696,560 A | 12/1997 | Songer .................... 348/436 |
| 5,699,740 A | 12/1997 | Gelbart .................... 101/477 |
| 5,704,700 A | 1/1998 | Kappel et al. ............. 353/31 |
| 5,707,160 A | 1/1998 | Bowen ..................... 400/472 |
| 5,712,649 A | 1/1998 | Tosaki ......................... 345/8 |
| 5,713,652 A | 2/1998 | Zavracky et al. ......... 353/122 |
| 5,726,480 A | 3/1998 | Pister ....................... 257/415 |
| 5,731,802 A | 3/1998 | Aras et al. ............... 345/148 |
| 5,734,224 A | 3/1998 | Tagawa et al. ........... 313/493 |
| 5,742,373 A | 4/1998 | Alvelda ................... 349/204 |
| 5,744,752 A | 4/1998 | McHerron et al. ....... 174/52.4 |
| 5,745,271 A | 4/1998 | Ford et al. ............... 359/130 |
| 5,757,354 A | 5/1998 | Kawamura ............... 345/126 |
| 5,757,536 A | 5/1998 | Ricco et al. ............. 359/224 |
| 5,764,280 A | 6/1998 | Bloom et al. ............. 248/53 |
| 5,768,009 A | 6/1998 | Little ....................... 359/293 |
| 5,770,473 A | 6/1998 | Hall et al. ................. 438/26 |
| 5,793,519 A | 8/1998 | Furlani et al. ............ 359/291 |
| 5,798,743 A | 8/1998 | Bloom ....................... 345/90 |
| 5,798,805 A | 8/1998 | Ooi et al. ................... 349/10 |
| 5,801,074 A | 9/1998 | Kim et al. ................ 438/125 |
| 5,802,222 A | 9/1998 | Rasch et al. ................ 385/1 |
| 5,808,323 A | 9/1998 | Spaeth et al. .............. 257/88 |
| 5,808,797 A | 9/1998 | Bloom et al. ............ 359/572 |
| 5,815,126 A | 9/1998 | Fan et al. ..................... 345/8 |
| 5,825,443 A | 10/1998 | Kawasaki et al. .......... 349/95 |
| 5,832,148 A | 11/1998 | Yariv |
| 5,835,255 A | 11/1998 | Miles ....................... 359/291 |
| 5,835,256 A | 11/1998 | Huibers ................... 359/291 |
| 5,837,562 A | 11/1998 | Cho ........................... 438/51 |
| 5,841,579 A | 11/1998 | Bloom et al. ............ 359/572 |
| 5,841,929 A | 11/1998 | Komatsu et al. |
| 5,844,711 A | 12/1998 | Long, Jr. ................. 359/291 |
| 5,847,859 A | 12/1998 | Murata .................... 359/291 |
| 5,862,164 A | 1/1999 | Hill ........................... 372/27 |
| 5,868,854 A | 2/1999 | Kojima et al. ............ 134/1.3 |
| 5,886,675 A | 3/1999 | Aye et al. ..................... 345/7 |
| 5,892,505 A | 4/1999 | Tropper ................... 345/208 |
| 5,895,233 A | 4/1999 | Higashi et al. ........... 438/107 |
| 5,898,515 A | 4/1999 | Furlani et al. ............ 359/290 |
| 5,903,243 A | 5/1999 | Jones ........................... 345/7 |
| 5,903,395 A | 5/1999 | Rallison et al. .......... 359/630 |
| 5,904,737 A | 5/1999 | Preston et al. .............. 8/158 |
| 5,910,856 A | 6/1999 | Ghosh et al. ............ 359/291 |
| 5,912,094 A | 6/1999 | Aksyuk et al. .............. 430/5 |
| 5,912,608 A | 6/1999 | Asada ...................... 335/222 |
| 5,914,801 A | 6/1999 | Dhuler et al. ............ 359/230 |
| 5,915,168 A | 6/1999 | Salatino et al. .......... 438/110 |
| 5,919,548 A | 7/1999 | Barron et al. ............ 428/138 |
| 5,920,411 A | 7/1999 | Duck et al. .............. 359/127 |
| 5,920,418 A | 7/1999 | Shiono et al. ............ 359/246 |
| 5,923,475 A | 7/1999 | Kurtz et al. .............. 359/619 |
| 5,926,309 A | 7/1999 | Little ....................... 359/293 |
| 5,926,318 A | 7/1999 | Hebert ..................... 359/618 |
| 5,942,791 A | 8/1999 | Shorrocks et al. ........ 257/522 |
| 5,949,390 A | 9/1999 | Nomura et al. ............ 345/32 |
| 5,949,570 A | 9/1999 | Shiono et al. ............ 359/291 |
| 5,953,161 A | 9/1999 | Troxell et al. ........... 359/618 |
| 5,955,771 A | 9/1999 | Kurtz et al. .............. 257/419 |
| 5,963,788 A | 10/1999 | Barron et al. ............. 438/48 |
| 5,978,127 A | 11/1999 | Berg ........................ 359/279 |
| 5,982,553 A | 11/1999 | Bloom et al. ............ 359/627 |
| 5,986,634 A | 11/1999 | Alioshin et al. .......... 345/126 |
| 5,986,796 A | 11/1999 | Miles ....................... 359/260 |
| 5,995,303 A | 11/1999 | Honguh et al. ........... 359/708 |
| 5,999,319 A | 12/1999 | Castracane .............. 359/573 |
| 6,004,912 A | 12/1999 | Gudeman ................ 508/577 |
| 6,012,336 A | 1/2000 | Eaton et al. |
| 6,016,222 A | 1/2000 | Setani et al. ............. 359/571 |
| 6,025,859 A | 2/2000 | Ide et al. .................. 347/135 |
| 6,025,951 A * | 2/2000 | Swart et al. ............. 359/245 |
| 6,038,057 A | 3/2000 | Brazas, Jr. et al. ...... 359/291 |
| 6,040,748 A | 3/2000 | Gueissaz ................... 335/78 |
| 6,046,840 A | 4/2000 | Huibers ................... 359/291 |
| 6,055,090 A | 4/2000 | Miles ....................... 359/291 |
| 6,057,520 A | 5/2000 | Goodwin-Johansson .... 200/181 |
| 6,061,166 A | 5/2000 | Furlani et al. ............ 359/254 |
| 6,061,489 A | 5/2000 | Ezra ......................... 365/115 |
| 6,062,461 A | 5/2000 | Sparks et al. ........... 226/123.1 |
| 6,064,404 A | 5/2000 | Aras et al. ............... 345/507 |
| 6,069,392 A | 5/2000 | Tai et al. .................. 257/419 |
| 6,071,652 A | 6/2000 | Feldman et al. ............. 430/5 |
| 6,075,632 A | 6/2000 | Braun ...................... 359/124 |
| 6,084,626 A | 7/2000 | Ramanujan et al. ...... 347/239 |
| 6,088,102 A | 7/2000 | Manhart ................... 356/354 |
| 6,090,717 A | 7/2000 | Powell et al. ............ 438/710 |
| 6,091,521 A | 7/2000 | Popovich ................... 359/15 |
| 6,096,576 A | 8/2000 | Corbin et al. ............ 438/108 |
| 6,096,656 A | 8/2000 | Matzke et al. |
| 6,097,352 A | 8/2000 | Zavracky et al. ............ 345/7 |
| 6,101,036 A | 8/2000 | Bloom ..................... 359/567 |
| 6,115,168 A | 9/2000 | Zhao et al. ............... 359/247 |
| 6,122,299 A | 9/2000 | DeMars et al. ............ 372/20 |
| 6,123,985 A | 9/2000 | Robinson et al. ......... 427/162 |
| 6,124,145 A | 9/2000 | Stemme et al. ............ 438/26 |
| 6,130,770 A | 10/2000 | Bloom ..................... 359/224 |
| 6,144,481 A | 11/2000 | Kowarz et al. ........... 359/291 |
| 6,147,789 A | 11/2000 | Gelbart .................... 359/231 |
| 6,154,259 A | 11/2000 | Hargis et al. ............. 348/756 |
| 6,154,305 A | 11/2000 | Dickensheets et al. |
| 6,163,026 A | 12/2000 | Bawolek et al. ......... 250/351 |
| 6,163,402 A | 12/2000 | Chou et al. .............. 359/443 |
| 6,169,624 B1 | 1/2001 | Godil et al. .............. 359/237 |
| 6,172,796 B1 | 1/2001 | Kowarz et al. ........... 359/290 |
| 6,172,797 B1 | 1/2001 | Huibers ................... 359/291 |
| 6,177,980 B1 | 1/2001 | Johnson ..................... 355/67 |
| 6,181,458 B1 | 1/2001 | Brazas, Jr. et al. ...... 359/290 |
| 6,188,519 B1 | 2/2001 | Johnson ................... 359/572 |
| 6,195,196 B1 | 2/2001 | Kimura et al. ........... 359/295 |
| 6,197,610 B1 | 3/2001 | Toda .......................... 438/50 |
| 6,210,988 B1 | 4/2001 | Howe et al. ................ 438/50 |
| 6,215,579 B1 | 4/2001 | Bloom et al. ............ 359/298 |
| 6,219,015 B1 | 4/2001 | Bloom et al. .............. 345/87 |
| 6,222,954 B1 * | 4/2001 | Riza ........................... 385/18 |
| 6,229,650 B1 | 5/2001 | Reznichenko et al. ....... 359/566 |
| 6,229,683 B1 | 5/2001 | Goodwin-Johansson .... 361/233 |
| 6,241,143 B1 | 6/2001 | Kuroda .................. 228/110.1 |
| 6,249,381 B1 | 6/2001 | Suganuma |
| 6,251,842 B1 | 6/2001 | Gudeman ................ 508/577 |
| 6,252,697 B1 | 6/2001 | Hawkins et al. .......... 359/290 |
| 6,254,792 B1 | 7/2001 | Van Buskirk et al. ....... 216/13 |
| 6,261,494 B1 | 7/2001 | Zavracky et al. ......... 264/104 |
| 6,268,952 B1 | 7/2001 | Godil et al. .............. 359/291 |
| 6,271,145 B1 | 8/2001 | Toda ........................ 438/706 |
| 6,271,808 B1 | 8/2001 | Corbin ......................... 345/7 |
| 6,274,469 B1 | 8/2001 | Yu ............................ 438/592 |
| 6,282,213 B1 | 8/2001 | Gutin et al. |
| 6,286,231 B1 | 9/2001 | Bergman et al. ........... 34/410 |
| 6,290,859 B1 | 9/2001 | Fleming et al. ............. 216/2 |
| 6,290,864 B1 | 9/2001 | Patel et al. ................. 215/79 |
| 6,300,148 B1 | 10/2001 | Birdsley et al. ............ 438/15 |
| 6,303,986 B1 | 10/2001 | Shook ...................... 257/680 |
| 6,310,018 B1 | 10/2001 | Behr et al. ................ 510/175 |
| 6,313,901 B1 | 11/2001 | Cacharelis |
| 6,323,984 B1 | 11/2001 | Trisnadi .................. 359/245 |
| 6,327,071 B1 | 12/2001 | Kimura .................... 359/291 |

| | | | |
|---|---|---|---|
| 6,342,960 B1 | 1/2002 | McCullough | 359/124 |
| 6,346,430 B1 | 2/2002 | Raj et al. | |
| 6,356,577 B1 | 3/2002 | Miller | 372/107 |
| 6,356,689 B1 | 3/2002 | Greywall | 385/52 |
| 6,359,333 B1 | 3/2002 | Wood et al. | 257/704 |
| 6,384,959 B1 | 5/2002 | Furlani et al. | 359/291 |
| 6,387,723 B1 | 5/2002 | Payne et al. | 438/48 |
| 6,392,309 B1 | 5/2002 | Wataya et al. | 257/796 |
| 6,396,789 B1 | 5/2002 | Guerra et al. | 369/112 |
| 6,418,152 B1 | 7/2002 | Davis | |
| 6,421,179 B1 | 7/2002 | Gutin et al. | 359/572 |
| 6,438,954 B1 | 8/2002 | Goetz et al. | |
| 6,445,502 B1 | 9/2002 | Islam et al. | 359/571 |
| 6,452,260 B1 | 9/2002 | Corbin et al. | 257/686 |
| 6,466,354 B1 | 10/2002 | Gudeman | 359/247 |
| 6,479,811 B1 | 11/2002 | Kruschwitz et al. | |
| 6,480,634 B1 | 11/2002 | Corrigan | 385/4 |
| 6,497,490 B1 | 12/2002 | Miller et al. | 359/614 |
| 6,525,863 B1 | 2/2003 | Riza | 359/290 |
| 6,563,974 B1 | 5/2003 | Riza | 385/16 |
| 6,565,222 B1 | 5/2003 | Ishii et al. | 359/883 |
| 6,569,717 B1 | 5/2003 | Murade | |
| 6,782,205 B1 * | 8/2004 | Trisnadi et al. | 398/94 |
| 2001/0019454 A1 | 9/2001 | Tadic-Galeb et al. | 359/649 |
| 2002/0015230 A1 | 2/2002 | Pilossof et al. | 359/558 |
| 2002/0021485 A1 | 2/2002 | Pilossof | 359/295 |
| 2002/0079432 A1 | 6/2002 | Lee et al. | 250/216 |
| 2002/0105725 A1 | 8/2002 | Sweatt et al. | 359/566 |
| 2002/0112746 A1 | 8/2002 | DeYoung et al. | 134/36 |
| 2002/0131228 A1 | 9/2002 | Potter | |
| 2002/0131230 A1 | 9/2002 | Potter | 361/277 |
| 2002/0135708 A1 | 9/2002 | Murden et al. | |
| 2002/0176151 A1 | 11/2002 | Moon et al. | |
| 2002/0195418 A1 | 12/2002 | Kowarz et al. | |
| 2002/0196492 A1 | 12/2002 | Trisnadi et al. | |
| 2003/0056078 A1 | 3/2003 | Johansson et al. | |

FOREIGN PATENT DOCUMENTS

| | | |
|---|---|---|
| DE | 43 23 799 A1 | 1/1994 |
| DE | 197 23 618 A1 | 12/1997 |
| DE | 197 51 716 A1 | 5/1998 |
| DE | 198 46 532 C1 | 5/2000 |
| EP | 0 089 044 A2 | 9/1983 |
| EP | 0 261 901 A2 | 3/1988 |
| EP | 0 314 437 A1 | 10/1988 |
| EP | 0 304 263 A2 | 2/1989 |
| EP | 0 306 308 A2 | 3/1989 |
| EP | 0 322 714 A2 | 7/1989 |
| EP | 0 627 644 A3 | 9/1990 |
| EP | 0 423 513 A2 | 4/1991 |
| EP | 0 436 738 A1 | 7/1991 |
| EP | 0 458 316 A2 | 11/1991 |
| EP | 0 477 566 A2 | 4/1992 |
| EP | 0 488 326 A3 | 6/1992 |
| EP | 0 499 566 A2 | 8/1992 |
| EP | 0 528 646 A1 | 2/1993 |
| EP | 0 530 760 A2 | 3/1993 |
| EP | 0 550 189 A1 | 7/1993 |
| EP | 0 610 665 A1 | 8/1994 |
| EP | 0 627 644 A2 | 12/1994 |
| EP | 0 627 850 A1 | 12/1994 |
| EP | 0 643 314 A2 | 3/1995 |
| EP | 0 654 777 A1 | 5/1995 |
| EP | 0 658 868 A1 | 6/1995 |
| EP | 0 658 830 A1 | 12/1995 |
| EP | 0 689 078 A1 | 12/1995 |
| EP | 0 801 319 A1 | 10/1997 |
| EP | 0 851 492 A2 | 7/1998 |
| EP | 1 003 071 A2 | 5/2000 |
| EP | 1 014 143 A1 | 6/2000 |
| EP | 1 040 927 A2 | 10/2000 |
| GB | 2 117 564 A | 10/1983 |
| GB | 2 118 365 A | 10/1983 |
| GB | 2 266 385 A | 10/1993 |
| GB | 2 296 152 A | 6/1996 |
| GB | 2 319 424 A | 5/1998 |
| JP | 40-1155637 | 6/1989 |
| WO | WO 90/13913 | 11/1990 |
| WO | WO 92/12506 | 7/1992 |
| WO | WO 93/02269 | 2/1993 |
| WO | WO 93/09472 | 5/1993 |
| WO | WO 93/18428 | 9/1993 |
| WO | WO 93/22694 | 11/1993 |
| WO | WO 94/09473 | 4/1994 |
| WO | WO 94/29761 | 12/1994 |
| WO | WO 95/11473 | 4/1995 |
| WO | WO 96/02941 | 2/1996 |
| WO | WO 96/08031 | 3/1996 |
| WO | WO 96/41217 | 12/1996 |
| WO | WO 96/41224 | 12/1996 |
| WO | WO 97/22033 | 6/1997 |
| WO | WO 97/26569 | 7/1997 |
| WO | WO 98/05935 | 2/1998 |
| WO | WO 98/24240 | 6/1998 |
| WO | WO 98/41893 | 9/1998 |
| WO | WO 99/07146 | 2/1999 |
| WO | WO 99/12208 | 3/1999 |
| WO | WO 99/23520 | 5/1999 |
| WO | WO 99/34484 | 7/1999 |
| WO | WO 99/59335 | 11/1999 |
| WO | WO 99/63388 | 12/1999 |
| WO | WO 99/67671 | 12/1999 |
| WO | WO 00/04718 | 1/2000 |
| WO | WO 00/07225 | 2/2000 |
| WO | WO 01/04674 A1 | 1/2001 |
| WO | WO 01/006297 A3 | 1/2001 |
| WO | WO 01/57581 A3 | 8/2001 |
| WO | WO 02/025348 A3 | 3/2002 |
| WO | WO 02/31575 A2 | 4/2002 |
| WO | WO 02/058111 A2 | 7/2002 |
| WO | WO 02/065184 A3 | 8/2002 |
| WO | WO 02/073286 A2 | 9/2002 |
| WO | WO 02/084375 A1 | 10/2002 |
| WO | WO 02/084397 A3 | 10/2002 |
| WO | WO 03/001281 A1 | 1/2003 |
| WO | WO 03/001716 A1 | 1/2003 |
| WO | WO 03/012523 A1 | 2/2003 |
| WO | WO 03/016965 A1 | 2/2003 |
| WO | WO 03/023849 A1 | 3/2003 |
| WO | WO 03/025628 A2 | 3/2003 |

OTHER PUBLICATIONS

O. Solgaard, "Integrated Semiconductor Light Modulators for Fiber-Optic and Display Applications", Ph.D. Dissertation, Stanford University Feb., 1992.

J. Neff, "Two-Dimensional Spatial Light Modulators: A Tutorial", Proceedings of the IEEE, vol. 78, No. 5 (May 1990), pp. 826-855.

R. Gerhard-Multhaupt, "Viscoelastic Spatial Light Modulators and Schlieren-Optical Systems for HDTV Projection Displays" SPIE vol. 1255 Large Screen Projection Displays 11 (1990), pp. 69-78.

R. Gerhard-Multhaupt, "Light-Valve Technologies for High-Definition Television Projection Displays", Displays vol. 12, No. 3/4 (1991), pp. 115-128.

O. Solgaard, F. Sandejas, and D. Bloom, "Deformable Grating Optical Modulator," Optics Letters, vol. 17, No. 9, May 1, 1992, New York, USA, pp. 688-690.

F. Sandejas, R. Apte, W. Banyai, and D. Bloom, "Surface Microfabrication of Deformable Grating Valve for High Resolution Displays," The 7th International Conference on Solid-State Sensors and Actuators.

P. Alvelda, "High-Efficiency Color Microdisplays," SID 95 Digest, pp. 307-311, 1995.

Worboys et al., "Miniature Display Technology for Integrated Helmut Systems," GEC Journal of Research, vol. 10, No. 2, pp. 111-118, Chelmsford, Essex, GB 1993.

M. Farn et al., "Color Separation by use of Binary Optics," Optics Letters, vol. 18:15 pp. 1214-1216, 1993.

P. Alvelda, "VLSI Microdisplays and Optoelectric Technology," MIT, pp. 1-93, 1995.

P. Alvelda, "VLSI Microdisplay Technology," Oct. 14, 1994.

D. Rowe, "Laser Beam Scanning," SPIE, vol. 2088, Oct. 5, 1993, 18-26.

L. Hornbeck, "Deformable-Mirror Spatial Light Modulators," Spatial Light Modulators and Applications III, Aug. 8, CA 1989, pp. 86-102.

Russick et al., "Supercritical Carbon Dioxide Extraction of Solvent from Micromachined Structures," Supercritical Fluids, Chapter 18, American Chemical Society, pp. 255-269, 1997.

Buhler et al., "Linear Array of Complementary Metal Oxide Semiconductor Double-Pass Metal Micromirrors,"Optical Engineering, vol. 36, No. 5, pp. 1391-1398, May 1997.

Gani et al., "Variable Gratings for Optical Switching: Rigorous Electromagnetic Simulation and Design," Optical Engineering, vol. 38, No. 3, pp. 552-557, Mar. 1999.

R. Tepe, et al. "Viscoelastic Spatial Light Modulator with Active Matrix Addressing," Applied Optics, vol. 28, No. 22, New York, USA, pp. 4826-4834, Nov. 15, 1989.

W. Brinker, et al., "Deformation Behavior of Thin Viscoelastic Layers Used in an Active-Matrix-Addressed Spatial Light Modulator," SPIE vol. 1018, pp. 79-85, Germany, 1988.

T. Utsunomiya and H. Sato, "Electrically Deformable Echellette Grating and its Application to Tunable Laser Resonator," Electronics and Communications in Japan, vol. 63-c, No. 10, pp. 94-100, Japan, 1980.

Burns, D.M. et al., *Development of microelectromechanical variable blaze gratings*, Sensors and Actuators A, pp. 7-15, 1998.

R.N. Thomas, et al., "The Mirror-Matrix Tube: A Novel Light Valve for Projection Displays", IEEE Transactions on Electron Devices, vol. ED-22, No. 9, pp. 765-775, Sep. 1975.

J. Guldberg, et al., "An Aluminum/SiO2/Silicon-on-Sapphire Light Valve Matrix for Projection Displays," Applied Physics Letters, vol. 26, No. 7, pp. 391-393, Apr. 1975.

"Kitchen Computer", IBM Technical Disclosure Bulletin, vol. 37, No. 12, pp. 223-225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long-Haul WDM Communication Systems" IEEE Photonics Technology Letters, vol. 9, No. 3, Mar. 1997.pp. 377 of 379.

N. J. Frigo et al., "A Wavelength-Division Multiplexed Passive Optical Network with Cost-Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13-16, 1994.

Sene et al., "Polysilicon micromechnical gratings for optical modulation," Sensors and Actuators, vol. A57, pp. 145-151, 1996.

Amm et al., "Invited Paper: Grating Light Valve™ Technology: Update and Novel Applications," SID Digest, vol. 29, 1998.

Development of Digital MEMS-Based Display Technology Promises Improved Resolution, Contrast, and Speed, XP-000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", Received Jun. 4, 1976, p. 103-115.

Olga B. Spahn, et al., "High Optical Power Handling of Pop-Up Microelectromechanical Mirrors", Sandia National Laboratories, IEEE 2000, p. 51-52.

David M. Burns, et al. "Optical Power Induced Damage to Microelectromechanical Mirrors", Sensors and Actuators A 70, 1998, p. 6-14.

V.S. Aliev et al., "Development of Si(100) surface roughness at the initial stage of etching in F2 and XeF2 gases: ellipsometric study," Surface Science 442 (1999), pp. 206-214.

Xuan-Qi Wang et al., "Gas-Phase Silicon Etching with Bromine Trifluoride," Depart. of Electrical Engineering, 136-93 California Institute of Technology, 1997 IEEE, pp. 1505-1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927-931.

F.A. Houle, "Dynamics of SiF4 desorption during etching of silicon by XeF2," J. Chem. Phys. 87 (3), Aug. 1, 1987, pp. 1866-1872.

Mehran Mehregany, "Microelectromechanical Systems," 1993 IEEE, pp. 14-22.

D. Moser et al., "A CMOS Compatible Thermally Excited Silicon Oxide Beam Resonator with Aluminium Mirror," Physical Electronics Laboratory, 1991 IEEE, pp. 547-550.

M. Parameswaran et al., "Commerical CMOS Fabricated Integrated Dynamic Thermal Scene Simulator," 1991 IEEE, pp. 29.4.1-29.4.4.

M. Parameswaren et al., "CMOS Electrothermal Microactuators," Depart. of Electrical Engineering, 1990 IEEE, pp. 128-131.

U. Streller et al., "Selectivity in dry etching of Si(100) with XeF2 and VUV light," Applied Surface Science 106, (1996), pp. 341-346.

M.J.M Vugts et al., "Si/XeF2 etching: Temperature dependence," 1996 American Vacuum Society, pp. 2766-2774.

P. Krummenacher et al., "Smart Temperature Sensor in CMOS Technology," Sensors and Actuators, A-21-A-23 (1990), pp. 636-638.

Henry Baltes, "CMOS as sensor technology," Sensors and Actuators A. 37-38, (1993), pp. 51-56.

Thomas Boltshauser et al., "Piezoresistive Membrane Hygrometers Based on IC Technology," Sensor and Materials, 5, 3, (1993), pp. 125-134.

Z. Parpia et al., "Modelling of CMOS Compatible High Voltage Device Structures," pp. 41-50.

Jon Gildemeister, "Xenon Difluoride Etching System," 1997, UC Berkeley MicroTabrication Manual Chapter 7.15, p. 2-5.

W. Riethmuller et al., "A smart accelerometer with on-chip electronics fabricated by a commercial CMOS process," Sensors and Actuators A. 31, (1992), 121-124.

W. Gopel et al., "Sensors- A Comprehensive Survey," vol. 7, Weinheim New York, 44 pgs.

D. E. Ibbotson et al., "Comparison of XeF2 and F-atom reations with Si and SiO2," 1984 American Institute of Physics, pp. 1129-1131.

D. E. Ibbotson et al., "Plasmaless dry etching of silicon with fluorine-containing compounds," 1984 American Institute of Physics, pp. 2939-2942.

M.H. Hecht et al., "A novel x-ray photoelectron spectroscopy study of the Al/SiO2 interfaces," 1985 American Institute of Physics, pp. 5256-52616.

Daniel L. Flamm et al., "XeF2 and F-Atom Reactions with Si: Their Significance for Plasma Etching,," Solid State Technology, V. 26, #4, Apr. 1983, pp. 117-121.

H.F. Winters et al., "The etching of silicon with XeF2 vapor," Appl. Phys. Lett. vol. 34, No. 1, Jan. 1979, pp. 70-73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 1994, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison-Wesley, $2^{nd}$ edition, 1987, Adelphi University, pp. 163-169.

E. Hecht, "Optics", Addison-Wesley, $2^{nd}$ edition, 1987, Adelphi University, pp. 358-360.

T. Glaser et al., "Beam switching with binary single-order diffractive grating", XP-000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP-002183475, Dept. of Applied Physics, Calcutta University, 1975, pp. 63-67.

J. W. Goodman, "Some Fundamental Properties of Speckle", XP-002181682, Dept. of Electrical Engineering, Stanford University, 1976, pp. 1146-1150.

Lingli Wang et al., "Speckle Reduction in Laser Projection Systems by Diffractive Optical Elements", XP-000754330, Applied Optics, Apr. 1, 1998, vol. 37, No. 10, pp. 1770-1775.

R.W. Corrigan et al., "Calibration of a Scanned Linear Grating Light-Valve, Projection System for E-Cinema Applications", Silicon Light Machines, SID'99, San Jose, CA, 27 pgs, 1999.

R.W. Corrigan et al., "Calibration of a Scanned Linear Grating Light-Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral-Density Filters," New Focus, Inc., Santa Clara, CA, www.newfocus.com, May 7, 1999.

J. Hawkes et al., "Laser Theory and Practice," Prentice Hall, New York, 1995, pp. 407-408.

C. Tew et al., "Electronic Control of a Digital Micromirror Device for Projection Displays", Proceedings of the 1994 IEEE International Solid-State Circuits Conference, 1994.

Henck, S.A., "Lubrication of Digital Micromirror Devices™", Tribology Letters, No. 3, pp. 239-247, 1997.

K.W. Goossen et al., "Silicon Modulator Based on Mechanically-Active Anti-Reflection Layer with 1 Mbit/sec Capability for Fiber-in-the-Loop Applications", IEEE Protonics Technology Letters, vol. 6, No. 9, Sep. 1994, pp. 1119-1121.

J. A. Walker et al., "Demonstration of a Gain Flattened Optical Amplifier with Micromechanical Equalizer Element", Lucent Technologies, pp. 13-14.

A. P. Payne et al., "Resonance Measurements of Stresses in $Al/Si_3N_4$ Micro-Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault-Tolerant Multiwavelength Programmable Fiber-Optic Attenuator Using a Two-Dimensional Digital Micromirror Device", Optics Letters, Mar. 1, 1999, vol. 24, No. 5, pp. 282-284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309-2318.

P. Alvelda et al., "44.4: Ferroelectric Microdisplays Using Distortion-Compensated Pixel Layouts", SID 95 Digest, XP 2020715, pp. 931-933.

* cited by examiner

MEMS INTERFEROMETER-BASED RECONFIGURABLE OPTICAL ADD-AND-DROP MULTIPLEXOR

FIELD OF THE INVENTION

The present invention relates to an add-and-drop multiplexer. More particularly, this invention relates to a MEMS interferometer-based reconfigurable optical add-and-drop multiplexer.

BACKGROUND OF THE INVENTION

In WDM (wavelength division multiplexed) optical communication, multiple component wavelengths of light each carry a communication signal. Each of the multiple component wavelengths of light form a WDM channel. An OADM (optical add-drop multiplexer) is used for WDM signal management. WDM signals are transmitted from location to location using the channels. At a particular location, the signal within each channel is either passed for transmission to another location, or is dropped for local distribution. As signals are dropped, the channels corresponding to those dropped signals are free to accept new signals. The new signals are uploaded into the WDM signal at the same wavelength as the signal that was dropped. Maintaining an active signal in each channel maximizes total bandwidth.

The purpose of wavelength division multiplexing is to carry multiple signals over the same medium at the same time. To accomplish this, a number of channels are used. However, different signals may need to be transmitted to different locations. So, if a given signal is only transmitted a required distance, then that signal is dropped and another signal is added. This maximizes the total bandwidth utilization. In the case where a WDM signal contains signals 1, 2, 3 and 4, two of the signals, 2 and 4, are to be dropped for local distribution at a given location. At the given location, two new signals, 2' and 4', containing local information are uploaded. Signal 2' is modulated at the same wavelength as was signal 2, and signal 4' is modulated at the same wavelength as was signal 4. Added signals 2' and 4' are interlaced with the two passed signals 1 and 3 to form a WDM signal containing signals 1, 2', 3 and 4'. This process is referred to as an add/drop function.

To perform the add/drop function, the component signals within the WDM signal must first be isolated. Conventionally, a multiplexer/de-multiplexer, such as an array waveguide (AWG), is used to separate the component signals and to direct each component signal to a desired location. Waveguides tend to be expensive, they are typically delicate to set-up and maintain, and often require extensive thermal management.

Once the component signals are isolated, MEMS (MicroElectroMechanical System) devices or tilting mirrors are often used to reflect each component signal in a selectable direction. The component signal is either passed or dropped depending on the selected direction. To select a direction, the mirrors are moved or rotated using some type of mechanical means, for example a piezoelectric or pico-motor. Such mechanical movement produces mirror movements that may be less precise than desired. Mechanical movement also limits the speed by which the mirrors can be moved, and thus limits the speed by which the channels can be added/dropped.

An alternative means to perform the add/drop function is to use a Mach-Zehnder interferometer for each component signal. The Mach-Zehnder interferometer is an amplitude splitting device consisting of two beam splitters. The component signal is split into two portions and each portion is directed along separate optical paths. The two portions are eventually recombined. When recombined the two portions either constructively interfere or destructively interfere depending on whether or not the component signal is to be passed or dropped, respectively. The type of interference is determined by the phase difference between the two portions upon recombination. Changing the optical path lengths of one or both of the two portions can alter the phase difference. A difference between the optical path lengths can be introduced by a slight tilt of one of the beam splitters. To tilt the beam splitter though requires the use of some type of mechanical means, which once again limits speed and precision. Mach-Zehnder interferometers are also expensive and often require extensive thermal management.

What is needed is a method of adding and dropping channels within a WDM signal that is less expensive and simpler to implement and maintain then conventional optical add/drop multiplexers.

What is also needed is a method of adding and dropping channels within a WDM signal that is less expensive and simpler to implement and maintain then conventional optical add/drop multiplexers, and that increases speed and improves precision.

SUMMARY OF THE INVENTION

An embodiment of the present invention includes an interferometer. The interferometer comprises a beam splitter, a mirror and a phase modulator. The beam splitter splits a signal into a first portion and a second portion. The mirror reflects the first portion. The first portion includes an optical path length, which is fixed. The phase modulator includes a selectively actuated reflective element to reflect the second portion. The second portion includes an optical path length, which is variable. The reflective element is selectively actuated between a first position and a second position to vary the optical path length of the second portion. When the reflective element is in the first position, the first portion and the second portion constructively interfere thereby directing the component signal along a first output path. When the reflective element is in the second position, the first portion and the second portion destructively interfere thereby directing the component signal along a second output path.

Another embodiment of the present invention includes an apparatus for selectively passing and dropping first component signals of a first wavelength division multiplexed (WDM) signal and for selectively adding second component signals of a second WDM signal to the first WDM signal. The apparatus comprises a first optical train, a second optical train and an array of interferometers. The first optical train directs each component signal of the first WDM signal along a corresponding one of a plurality of first optical paths. The second optical train directs each component signal of the second WDM signal along a corresponding one of a plurality of second optical paths. The array of interferometers is configured to receive the first component signals along the plurality of first optical paths and the second component signals along the plurality of second optical paths. Each interferometer includes a beam splitter, a mirror and a phase modulator. The beam splitter receives a first signal along the first optical path and a second signal along the second optical path. The beam splitter splits each signal into a first portion and a second portion. The mirror reflects the first portion of each signal. An optical path length of the first portion is fixed. The phase modulator includes a selectively actuated reflective layer to reflect the second portion of each signal. The optical path length of the second portion is variable. The reflective layer is selectively actuated between a first position and a second position to vary the optical path length of the second portion. When the reflective layer is in the first position, the first portion and the second portion of the first signal constructively interfere and the first portion and the second portion of the second signal constructively interfere thereby directing the first signal back along the first optical path and the second signal back along the second optical path. When the reflective layer is in the second position, the first portion and the second portion of the first signal destructively interfere and the first portion and the second portion of the second signal destructively interfere thereby directing the first signal along the second optical path and the second signal along the first optical path.

DETAILED DESCRIPTION OF THE EMBODIMENTS

Embodiments of the present invention overcome the aforementioned deficiencies of the background art by providing an interferometric device using MEMS actuation to add and drop channels within a WDM signal. The WDM signal is de-multiplexed, preferably using free-space optics, into its component wavelength signals. Each component signal is then mapped to a particular phase modulator within a phase modulator array. Each phase modulator is used to drop or pass its corresponding component signal. If the component signal is dropped, a new signal can be added at that corresponding wavelength. The phase modulator is preferably a tunable Michelson interferometer with a MEMS phase modulator. The phase modulator preferably includes a beam splitter, mirror and the MEMS phase modulator. The beam splitter splits the component signal into a first and second portion. The first portion is directed to the mirror that reflects the first portion back along its same optical path. The second portion is directed to a reflective layer within the MEMS phase modulator and is reflected back along its same optical path. The first and second portions are recombined at the beam splitter. Through selective movement of the reflective layer, the optical path length of the second portion of light is altered, thereby changing the phase difference between the first and second portions. In this manner, the first and second portions of light selectively interfere when recombined to either pass or drop the component signal. If the first and second portion constructively interfere, then the recombined signal is directed back along the same optical path as the component signal entering the phase modulator. In this case, the component signal is passed. If the first and second portion destructively interfere, then the recombined signal is directed out of the phase modulator along an output optical path different than the optical path by which the component signal entered the phase modulator. In this case the component signal is dropped. When the component signal is dropped, a new signal can be added at the same wavelength as the dropped signal through use of a circulator, a de-multiplexer and mapping optics symmetrical to those used in providing the original component signal to the phase modulator.

Figure 1:
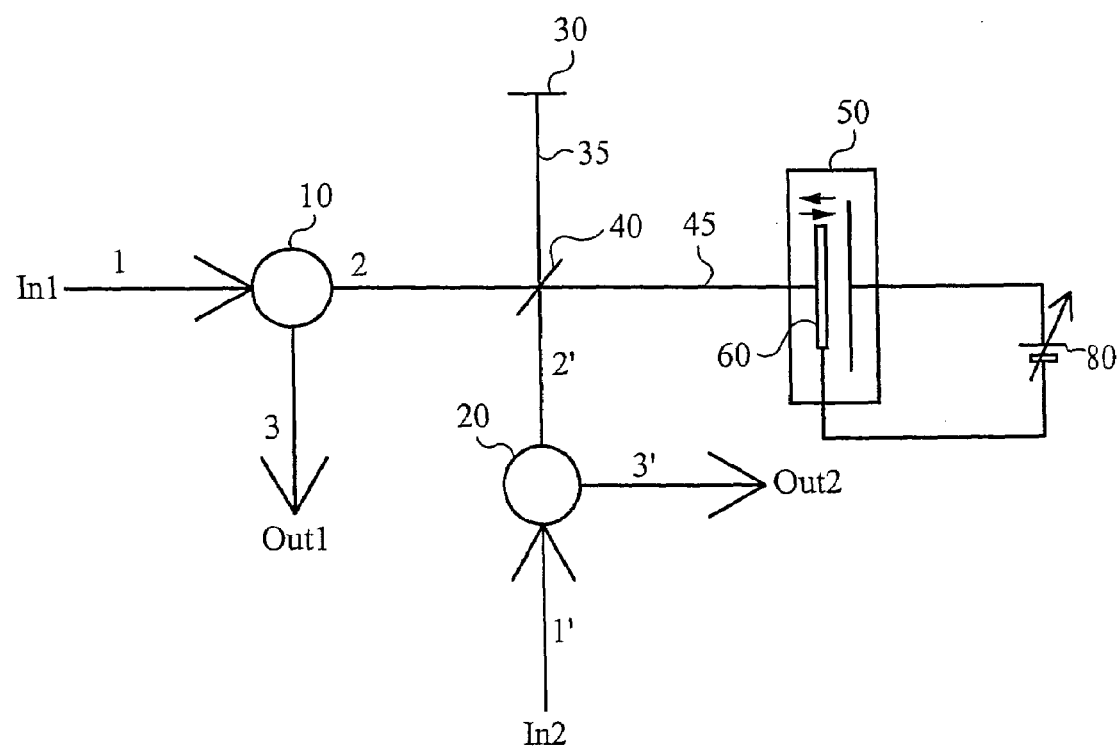
FIG. 1 illustrates a one-channel schematic configuration of a tunable interferometer with MEMS phase modulator according to an embodiment of the present invention.

FIG. 1 illustrates a basic schematic configuration of the tunable interferometer with MEMS phase modulator according to an aspect of the embodiments of the present invention as it is applied to a single channel. The basic configuration illustrated in FIG. 1 can equally be applied to any number of channels. Preferably, each channel corresponds to a component wavelength signal within a WDM signal. An input signal In1 enters a circulator 10 at port 1, which is passed out port 2 to a beam splitter 40. The beam splitter 40 splits the signal into two portions. The first portion is directed along optical path 35 to a mirror 30. The first portion is reflected off mirror 30 back along optical path 35 to the beam splitter 40. The length of the optical path 35 is fixed. The second portion of the split signal is directed along optical path 45 to a MEMS phase modulator 50. The phase modulator 50 includes a reflective layer 60. The second portion is reflected off the reflective layer 60 back along optical path 45 to the beam splitter 40. The first and second portions of the split signal are recombined at the beam splitter 40.

The reflective layer 60 is electrically coupled to a voltage source 80. The reflective layer 60 can be moved along the optical path by selectively applying electrostatic force to the reflective layer 60. By moving the reflective layer 60, the optical path 45 can be lengthened or shortened. The first and second portions of the signal are in-phase as they travel along the optical path 35 towards the mirror 30 and along the optical path 45 towards the phase modulator 50. If the optical path 35 and the optical path 45 are of equal length, then the first and second portions return to the beam splitter 40 in-phase. More generally, if a round trip of the optical paths 35 and 45 are the same length or they differ in length by some whole number multiple of the wavelength of the signal, then the first and second portions return to the beam splitter 40 in-phase. If the first and second portions return to the beam splitter 40 in-phase, then they are recombined via constructive interference. In this case, due to the constructive interference, the recombined signal is directed back towards port 2 of the circulator 10. The circulator 10 directs the recombined signal out port 3 as output signal Out1. In this manner, a channel can be passed.

However, if the round-trip optical paths 35 and 45 differ in length by one-half the wavelength of the signal, then the first and second portions return to the beam splitter completely out-of-phase. More generally, if the round trip of the optical paths 35 and 45 differ in length by one-half the wavelength of the signal, or some whole number multiple plus one-half the wavelength, then the first and second portions return to the beam splitter 40 completely out-of-phase. That is, the phase difference between the two portions is 180 degrees. If the first and second portions return to the beam splitter 40 completely out-of-phase, then they are recombined via destructive interference. In this case, due to the destructive interference, the recombined signal is directed towards a port 2' of a circulator 20. The circulator 20 directs the recombined signal out port 3' as output signal Out2. In this manner, a channel can be dropped. By electrostatically actuating a reflective layer within a MEMS phase modulator, a channel can be variably dropped or passed. To achieve good extinction in the channel that does not receive the recombined signal, it is preferable that the light intensities of the first and second portions, as formed by the beam splitter 40 along paths 35 and 45, are equal.

Concurrent with the input signal In1 entering the circulator 10, an input signal In2 enters a port 1' of the circulator 20, which is passed out port 2' to the beam splitter 40. Similarly to the signal In1, the beam splitter 40 splits the signal In2 into two portions. The first portion is directed along optical path 35 to the mirror 30. The first portion is reflected off mirror 30 back along optical path 35 to the beam splitter 40. The second portion of the split signal In2 is directed along optical path 45 to the reflective layer 60. The second portion is reflected off the reflective layer 60 back along optical path 45 to the beam splitter 40. The first and second portions of the split signal In2 are recombined at the beam splitter 40.

The first and second portions of the signal In2 are in-phase as they travel along the optical path 35 towards the mirror 30 and along the optical path 45 towards the phase modulator 50, respectively. As with the first and second portion of the signal In1, if the first and second portions return to the beam splitter 40 in-phase, then they are recombined via constructive interference. In this case, due to the constructive interference, the recombined signal of In2 is directed back towards port 2' of the circulator 20. The circulator 20 directs the recombined signal of In2 out port 3' as output signal Out2. If the first and second portions of the signal In2 return to the beam splitter 40 completely out-of-phase, then they are recombined via destructive interference. In this case, due to the destructive interference, the recombined signal of In2 is directed towards the port 2 of the circulator 10. The circulator 10 directs the recombined signal of In2 out port 3 as output signal Out1. The symmetry of the system makes In1 and In2, as well as Out1 and Out2, interchangeable.

In summary, when the optical path difference between the two arms of the Michelson interferometer, optical paths 35 and 45, corresponds to an in-phase condition, then the input signal In1 is output at Out1 and the input signal In2 is output at Out2. In this case, the input signal In1 is passed through the device and input signal In2 is not added. When the optical path difference between the optical paths 35 and 45 corresponds to a completely out-of-phase condition, then the input signal In1 is output at Out2 and the input signal In2 is output at Out1. In this case, the input signal In1 is dropped and the input signal In2 is added in its place.

Figure 2:
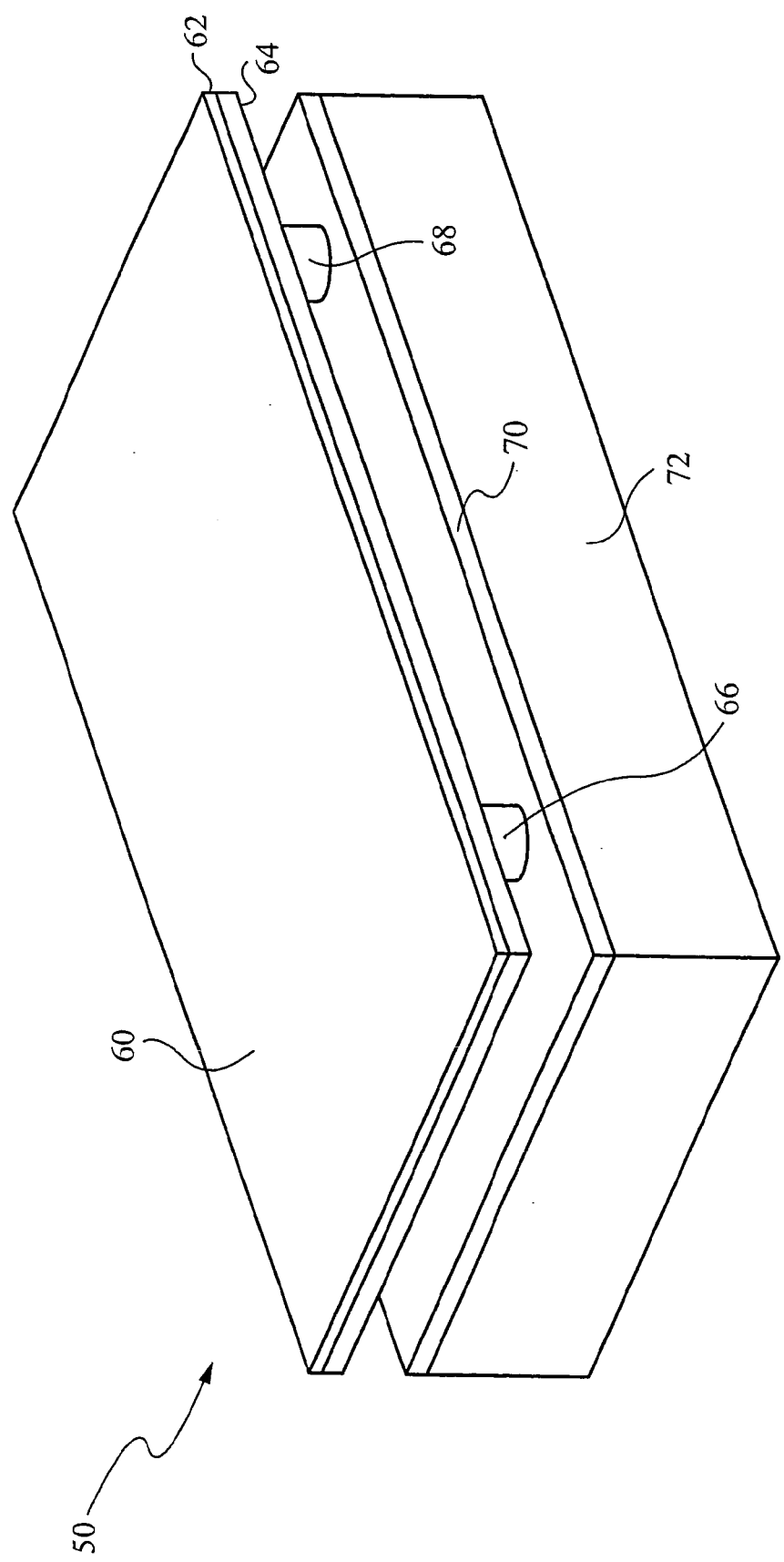
FIG. 2 illustrates the MEMS phase modulator according to an embodiment of the present invention.

FIG. 2 illustrates the MEMS phase modulator 50 according to the preferred embodiment of the present invention. The MEMS phase modulator 50 preferably includes the reflective layer 60 suspended by first and second posts, 66 and 68, above a substrate 72. The reflective layer 60 is preferably a single elongated element, 50–100 um wide. Although posts 66 and 68 preferably support the reflective layer 60, the reflective layer 60 can alternatively be supported by a support structure coupled at both ends of the reflective layer 60 to the substrate 72. The reflective layer 60 can also be supported by a circumferential support structure coupled around the circumference of the reflective layer 60 to the substrate 72.

The reflective layer 60 comprises a conducting and reflecting surface 62 and a resilient material 64. The substrate 72 comprises a conductor 70. Preferably, the conducting and reflecting surface 62 and the conductor 70 are comprised of aluminum.

Figure 3:
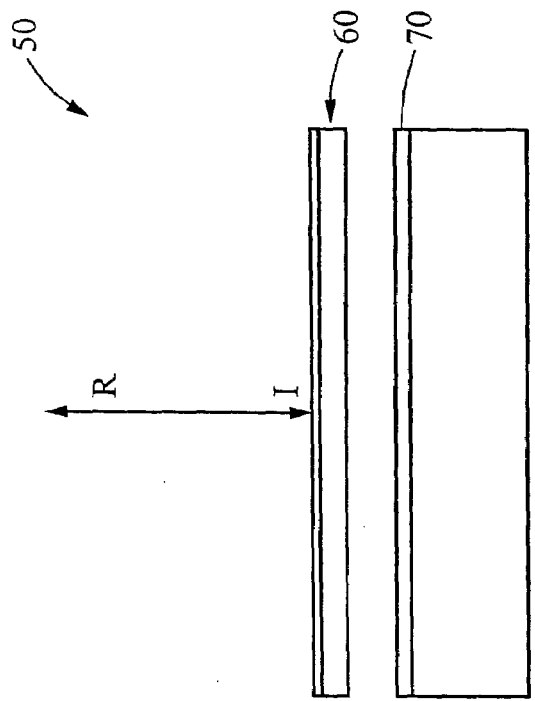
FIG. 3 illustrates a cross-section of the MEMS phase modulator in a non-actuated position.
Figure 4:
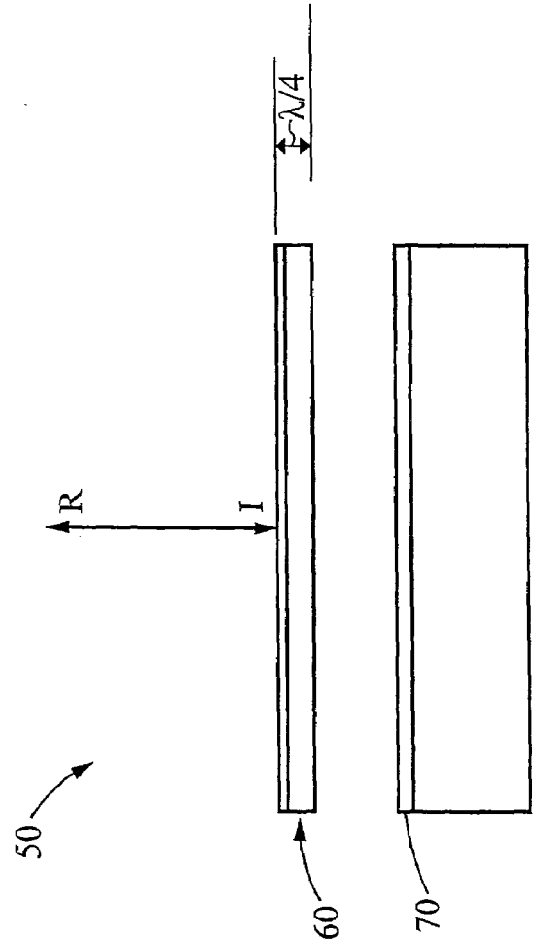
FIG. 4 illustrates a cross-section of the MEMS phase modulator in an actuated position.

FIGS. 3 and 4 illustrate a cross-section of the MEMS phase modulator 50 in a non-actuated position and an actuated position, respectively. In operation, the reflective layer 60 is moved from an un-deflected, or non-actuated position, towards the substrate 72 into a deflected, or actuated position. In the non-actuated position, the reflective layer 60 reflects an incident light I as reflected light R. In the actuated position, an electrical bias causes the reflective layer 60 to move towards the substrate 72. The electric bias is applied between the conducting and reflecting surface 62 and the conductor 70 by the voltage source 80 shown in FIG. 1. The electric bias causes a height difference between the non-actuated position and the actuated position of a quarter wavelength $\lambda/4$ of the incident light I. In the actuated position, the reflected light R is shifted by a round trip distance of $\lambda/2$.

It will be readily apparent to one skilled in the art that the conducting and reflecting surface 62 can be replaced by a multilayer dielectric reflector in which case a conducting element would also be included in each of the reflective layer 60. Further, it will be readily apparent to one skilled in the art that the conducting and reflecting surface 62 can be coated with a transparent layer such as an anti-reflective layer.

Referring to FIG. 1, the optical path length 45 between the beam splitter 40 and the reflective layer 60 is preferably designed to achieve the in-phase condition while in the non-actuated position. A height difference of a quarter wavelength $\lambda/4$ of the incident light I increases the optical path length 45 by $\lambda/4$. The second portion of the split signal traverses twice the optical path length 45. Therefore, if the reflective layer 60 is in the actuated position, then the second portion will traverse one-half wavelength $\lambda/2$ further than the first portion of the split signal upon returning to the beam splitter 40 for recombination. This results in the completely out-of-phase condition between the first portion and the second portion of the input signal. If the reflective layer 60 is in the non-actuated position, then the first portion and the second portion of the input signal remain in-phase upon returning to the beam splitter 40.

Alternatively, the position of the MEMS phase modulator 50 can be configured such that the optical path length between the beam splitter 40 and the reflective layer 60 in the non-actuated position results in the out-of-phase condition. In this case, when the reflective layer 60 is in the actuated position, the in-phase condition is achieved.

Although the MEMS phase modulator 50 has been described in terms of a single reflective layer 60, the MEMS phase modulator 50 can alternatively include several narrower electrically coupled reflective layers, or ribbons, that move in unison between the non-actuated and actuated positions. Where more than one ribbon is used, PDL, insertion losses and other deleterious effects must be carefully managed, for example by using a polarization diversity module, preferably of the type detailed in the co-pending U.S. patent application Ser. No. 10/318,658 entitled "Apparatus For Selectively Blocking WDM Channels", which is hereby incorporated by reference. Further, although the reflective layer 60 is illustrated as a rectangle, the reflective layer 60 can be a different shape, such as a circle or ellipse.

Figure 5:
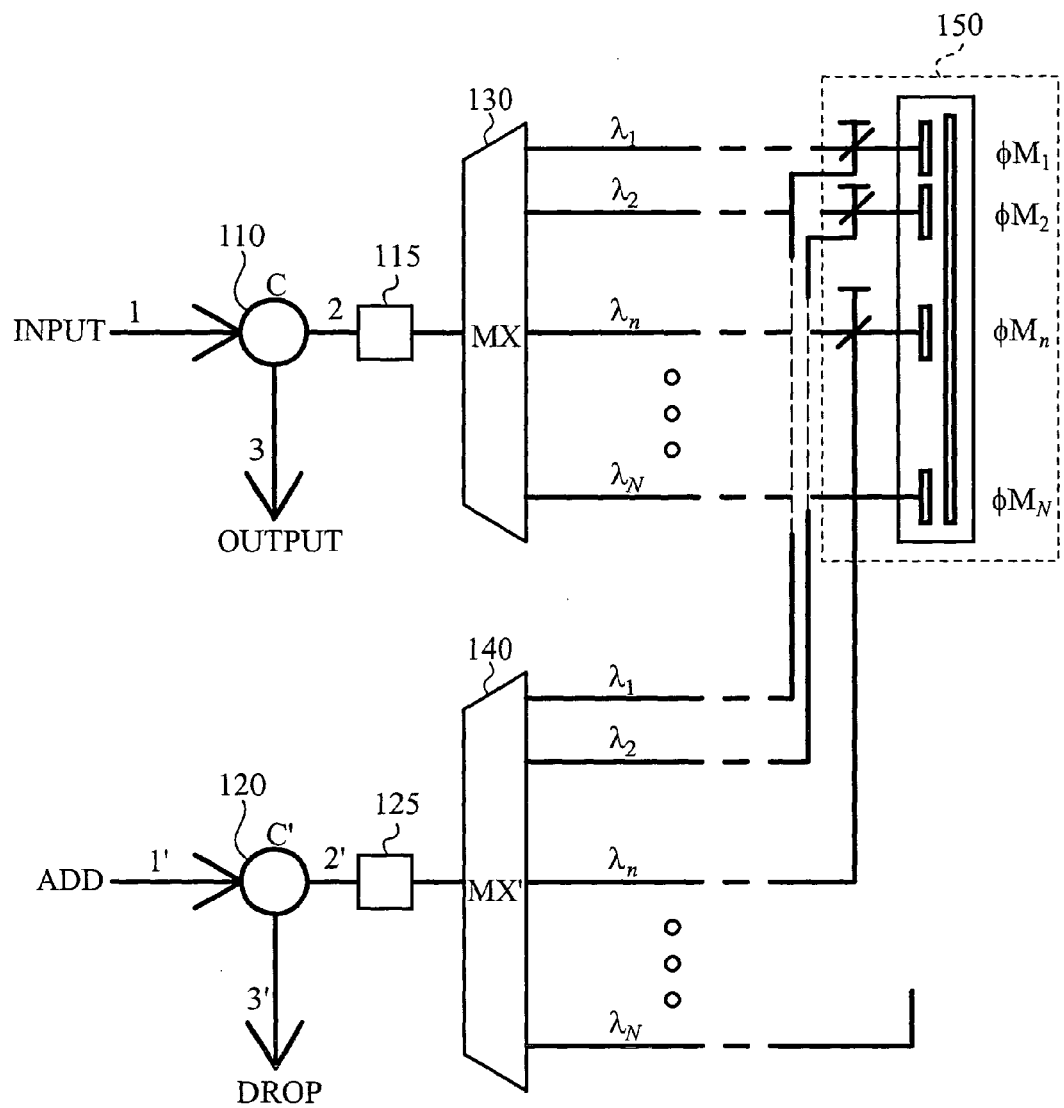
FIG. 5 illustrates a conceptual schematic of an optical add/drop multiplexer (OADM) according to an embodiment of the present invention.

FIG. 5 illustrates a conceptual schematic of an optical add/drop multiplexer (OADM) according to the present invention. The OADM illustrated in FIG. 5 is similar to the tunable interferometer with MEMS phase modulator illustrated in FIG. 1 with the exception that the OADM is applied to all channels within a WDM signal. Input WDM signal INPUT enters a circulator 110 at a port 1, which is passed out port 2 to a bi-directional multiplexer/de-multiplexer 130 via a first polarization diversity module 115. Polarization diversity modules substantially mitigate effects due to Polarization Dependent Loss (PDL). The multiplexer/de-multiplexer 130 decomposes the WDM signal into its component wavelength signals $\lambda_1$–$\lambda_N$, or channels. Each signal is directed to a corresponding interferometer with phase modulator within a phase modulator array 150. The phase modulator array 150 comprises an array of tunable interferometers with MEMS phase modulators $\Phi M_1$–$\Phi M_N$. Each of the tunable interferometers with phase modulator is of the type described in relation to FIG. 1. As such, each phase modulator $\Phi M_1$–$\Phi M_N$ passes or drops its corresponding component signal $\lambda_1$–$\lambda_N$ using MEMS actuation. All signals in which the corresponding phase modulator is set to an in-phase condition are passed back to the multiplexer/de-multiplexer 130. All signals in which the corresponding phase modulator is set to an out-of-phase condition are dropped. To drop the nth signal with wavelength $\lambda_n$ (n=1, 2, . . . , N), a reflective layer within the phase modulator $\Phi M_n$ is actuated a distance $\lambda_n/4$ to achieve the out-of-phase condition.

A second bi-directional multiplexer/de-multiplexer 140 is optically coupled to the phase modulator array 150 for receiving dropped signals. All dropped signals are then multiplexed by the multiplexer/de-multiplexer 140 and directed to a port 2' of a circulator 120 via a second polarization diversity module 125. The circulator 120 directs the dropped signals out port 3'.

When the phase modulator $\Phi M_n$ is set to the out-of-phase condition, the phase modulator $\Phi M_n$ can concurrently add another signal at the same wavelength $\lambda_n$. The added signal is input through an ADD port, port 1', of circulator 120. The added signal is part of a second WDM signal that includes other signals to be added to other channels, if appropriate. The second WDM signal is de-multiplexed at the multiplexer/de-multiplexer 140 into its component signals, including the signal to be added at the wavelength $\lambda_n$. The signal to be added is directed to the corresponding interferometer with phase modulator $\Phi M_n$. Since the phase modulator $\Phi M_n$ is in the out-of-phase condition, the added signal is directed to the multiplexer/de-multiplexer 130. In this manner, all channels to be added are directed to the multiplexer/de-multiplexer 130. All passed signals, for which the corresponding phase modulators are set in-phase, and all signals to be added, for which the corresponding phase modulators are set out-of-phase, are multiplexed by the multiplexer/de-multiplexer 130 and directed to the port 2. The circulator 110 then directs the multiplexed signal out port 3 as output signal OUTPUT.

The schematic illustrated in FIG. 5 is intended to aid in conceptualizing the present intention. Each element is generalized to describe their functions. For example, even though the element 140 is described as a bi-directional multiplexer/de-multiplexer, the element 140 can be any device that decomposes or recombines the input WDM signal into its component wavelength signals. Also, the means for directing the decomposed component wavelength signals from the multiplexer/de-multiplexer 140 to the phase modulator array 150 can be an array of waveguides, free-space optics, or any other means for spatially separating the component wavelength signals so that they are provided to a corresponding phase modulator on the phase modulator array 150.

Figure 6:
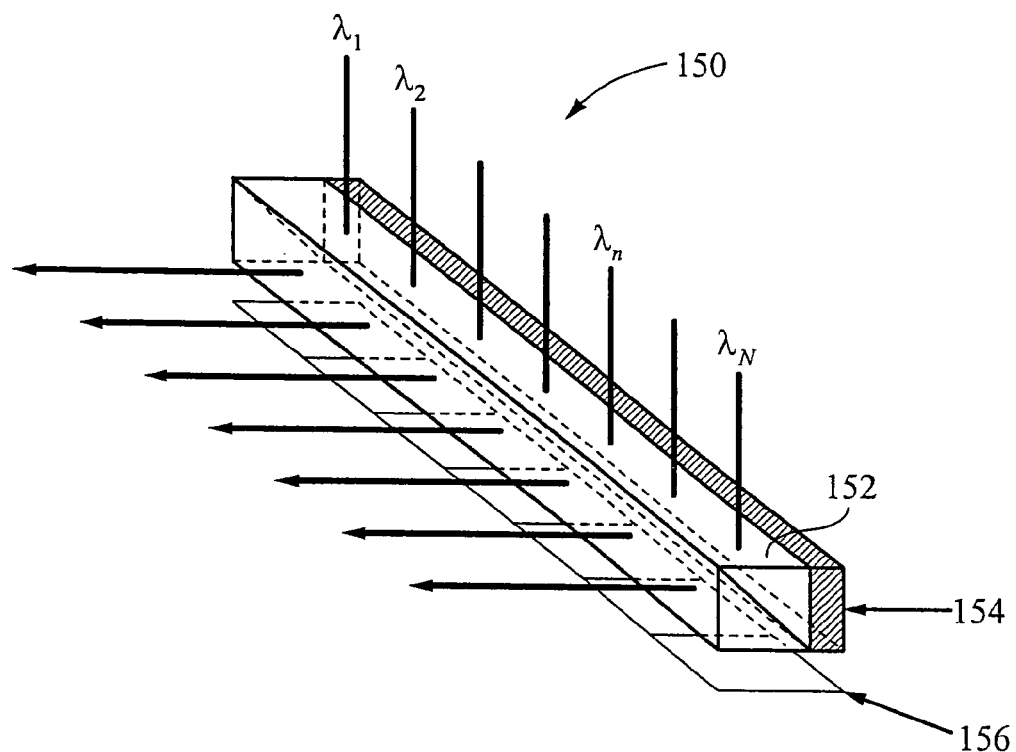
FIG. 6 illustrates an overview of a phase modulator array.
Figure 7:
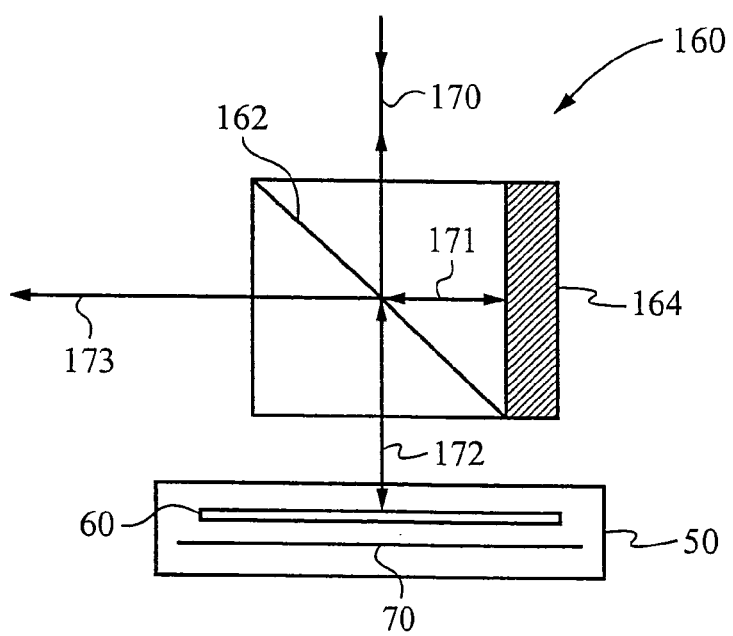
FIG. 7 illustrates a MEMS interferometer included within the phase modulator array.

FIG. 6 illustrates an overview of a first embodiment of the phase modulator array 150. In the first embodiment, the phase modulator array 150 includes a rectangular beam splitter 152, an array of mirrors 154 and an array of phase modulators 156. Each of the phase modulators within the array of phase modulators 156 is a phase modulator 50 of the type described in relation to FIGS. 1–4. Preferably, the beam splitter 152 is a single beam splitter. Alternatively, the beam splitter 152 comprises an array of individual beam splitters where each beam splitter corresponds to one of the phase modulators $\Phi M_1$–$\Phi M_N$. Alternatively, the mirror 154 is a single mirror. The array of mirrors 154 and beam splitter 152 together form an assembly that also acts as a cover glass to the phase modulator array 150. Preferably, the array of mirrors 154 comprises an array of individual mirrors where each mirror corresponds to one of the phase modulators $\Phi M_1$–$\Phi M_N$. Conceptually, each of the phase modulators $\Phi M_1$–$\Phi M_N$, a portion of the beam splitter 152, and each mirror of the array of mirrors 154 form a MEMS interferometer 160 as illustrated in FIG. 7. The first embodiment of the phase modulator array 150 comprises N MEMS interferometers 160, where N is the number of signals in the WDM signal. Each of the MEMS interferometers 160 receives one of the component wavelength signals $\lambda_1$–$\lambda_N$ from the multiplexer/de-multiplexer 130, as illustrated in FIG. 6.

FIG. 7 illustrates the MEMS interferometer 160 from the first embodiment of the phase modulator array 150. The MEMS interferometer 160 comprises the phase modulator 50, a beam splitter 162 and a mirror 164. In the preferred embodiment, the beam splitter 162 represents a portion of the beam splitter 152 (in FIG. 6). Similarly, in the preferred embodiment, the mirror 164 represents a portion of the mirror 154 (in FIG. 6). As such, the beam splitter 152 shown in FIG. 6 is preferably a single beam splitter, and the mirror 154 shown in FIG. 6 is preferably a single mirror. Alternatively, the beam splitter 152 (in FIG. 6) is an array of individual beam splitters and the beam splitter 162 is an individual beam splitter within the array. Alternatively, the mirror 154 (in FIG. 6) is an array of individual mirrors and the mirror 164 is an individual mirror within the array.

A corresponding component wavelength signal impinges the MEMS interferometer 160 along the optical path 170. The beam splitter 162 splits the signal into a first portion and a second portion. The first portion is directed along an optical path 171. The optical path length of optical path 171 is fixed. The first portion is reflected off mirror 164 back along the optical path 171 to the beam splitter 162. The second portion of the split signal is directed along optical path 172. The optical path length of the optical path 172 is variable. The second portion reflects off the reflective layer 60 of the phase modulator 50. The optical path length 172 is variable due to the moveable nature of the reflective layer 60. The reflected first and second portions are recombined at the beam splitter 162. When the reflective layer 60 is non-actuated, the difference between the optical path length 172 and the optical path length 171 results in the first and second portions of the split signal to interfere constructively. In this case, the first and second portions are phase shifted by zero and are said to be "in-phase". When the first and second portions are in-phase, the recombined signal is directed back along the optical path 170. This is considered a pass condition for the MEMS interferometer 160.

When the reflective layer 60 is actuated, the reflective layer deflects toward the substrate 72 thereby lengthening the optical path length 172 by a quarter wavelength $\lambda/4$ of the component signal. The difference between the optical path length 171 and the lengthened optical path length 172 results in the first and second portions of the split signal to interfere destructively. In this case, the first and second portions are phase shifted by 180 degrees and they are said to be "out-of-phase." When the first and second portion are out-of-phase, the recombined signal is directed along optical path 173. This is considered a drop condition for the MEMS interferometer 160.

The reflective layer 60 is moved to create interference that either adds or subtracts the first and second portions of the split signal. Adding the split portions acts to pass the signal through the MEMS interferometer, while subtracting the split portions acts to drop the signal. In this manner, the MEMS interferometer acts as a miniature Michelson interferometer using a MEMS device. For each component wavelength signal, there is a corresponding MEMS interferometer such that each signal can either be dropped or passed through the OADM. It is understood that the same effect can be obtained by shortening the optical path length 172 by a quarter wavelength $\lambda/4$ of the component signal.

Figure 8:
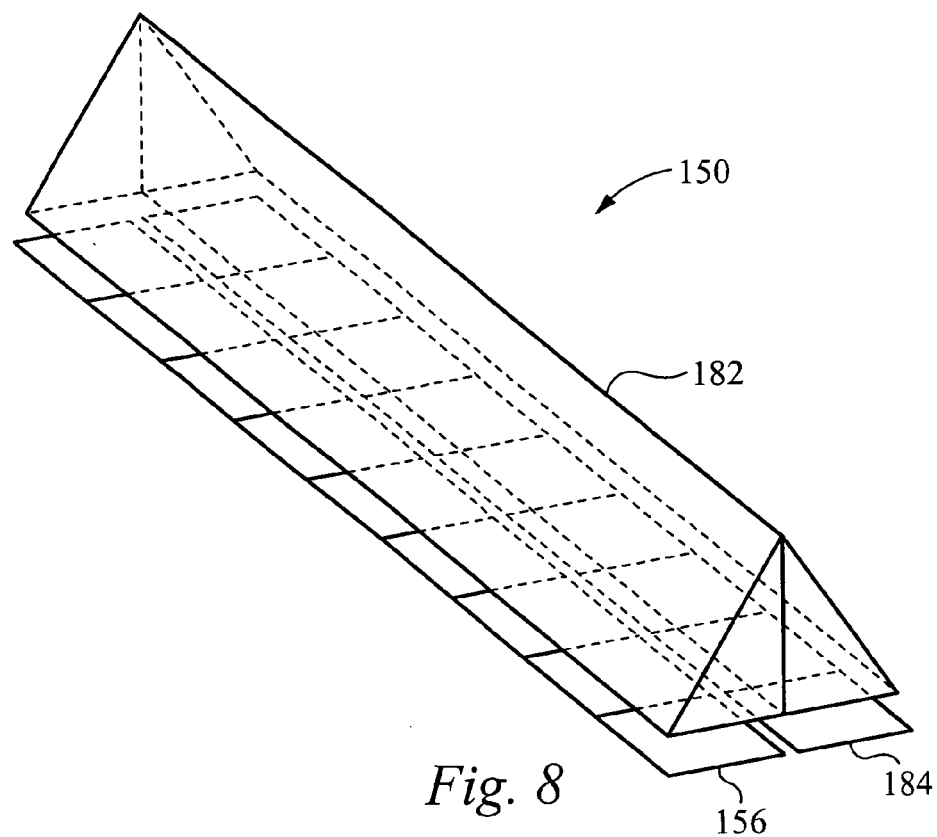
FIG. 8 illustrates an optical add-drop multiplexer (OADM) according to the preferred embodiment of the present invention.
Figure 9:
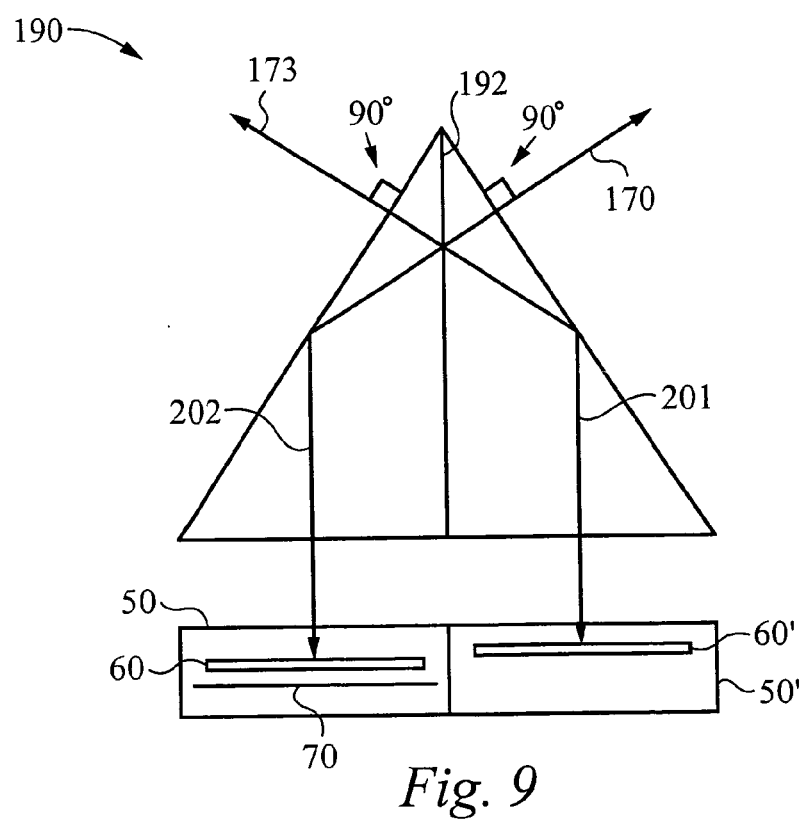
FIG. 9 illustrates a MEMS interferometer according to an embodiment of the present invention.

FIG. 8 illustrates an overview of a second and preferred embodiment of the phase modulator array 150. In the second embodiment, the phase modulator array 150 includes a triangular beam splitter 182, an array of stationary reflectors 184 and the array of phase modulators 156. Including the two reflectors, within the reflectors 184 and the phase modulators 156, on the same device is preferred because this condition is interferometrically more stable than separating the two reflectors into two parts. Each phase modulator 50 included within the array of phase modulators 156 is of the type described in relation to FIGS. 1–4, 6 and 7. The array of stationary reflectors 184 is preferably comprised of an array of phase modulators 50' (FIG. 9), where each phase modulator 50' is similar to the phase modulator 50 except that a reflective layer 60' remains stationary. Preferably, the beam splitter 182 is a single beam splitter. Alternatively, the beam splitter 182 comprises an array of individual beam splitters where each beam splitter corresponds to one of the phase modulators $\Phi M_1$–$\Phi M_N$. The array of stationary reflectors 184 and beam splitter 182 together form an assembly that also acts as a cover glass to the phase modulator array 150. Preferably, the array of stationary reflectors 184 comprises an array of individual phase modulators 50' where each phase modulator 50' corresponds to one of the phase modulators $\Phi M_1$–$\Phi M_N$. Conceptually, each of the phase modulators $\Phi M_1$–$\Phi M_N$, a portion of the beam splitter 182, and a each of the phase modulators 50' form a MEMS interferometer 190 as illustrated in FIG. 9. The second embodiment of the phase modulator array 150 comprises N MEMS interferometers 190, where N is the number of signals in the WDM signal. Each of the MEMS interferometers 190 receives one of the component wavelength signals $\lambda_1$–$\lambda_N$ from the multiplexer/de-multiplexer 130 illustrated in FIG. 5.

FIG. 9 illustrates the MEMS interferometer 190 from the second embodiment of the phase modulator array 150. The MEMS interferometer 190 comprises the phase modulator 50, a beam splitter 192 and the phase modulator 50'. In the preferred embodiment, the beam splitter 192 represents a portion of the beam splitter 182 (in FIG. 8). As such, the beam splitter 182 shown in FIG. 8 is preferably a single beam splitter. Alternatively, the beam splitter 182 (in FIG. 8) is an array of individual beam splitters and the beam splitter 192 is an individual beam splitter within the array.

A corresponding component wavelength signal impinges the MEMS interferometer 190 along the optical path 170. The beam splitter 192 splits the signal into a first portion and a second portion. The first portion is directed along an optical path 201. The optical path length of optical path 201 is fixed. The first portion is reflected off the reflective layer 60' back along the optical path 201 to the beam splitter 192. The second portion of the split signal is directed along optical path 202. The optical path length of the optical path 202 is variable. The second portion reflects off the reflective layer 60 of the phase modulator 50. The optical path length 202 is variable due to the moveable nature of the reflective layer 60. The reflected first and second portions are recombined at the beam splitter 192. When the reflective layer 60 is non-actuated, the difference between the optical path length 202 and the optical path length 201 results in the first and second portions of the split signal to interfere constructively. In this case, the first and second portions are phase shifted by zero and are said to be "in-phase". When the first and second portions are in-phase, the recombined signal is directed back along the optical path 170. This is considered a pass condition for the MEMS interferometer 190.

When the reflective layer 60 is actuated, the reflective layer deflects toward the substrate 72 thereby lengthening the optical path length 202 by a quarter wavelength $\lambda/4$ of the component signal. The difference between the optical path length 201 and the lengthened optical path length 202 results in the first and second portions of the split signal to interfere destructively. In this case, the first and second portions are phase shifted by 180 degrees and they are said to be "out-of-phase." When the first and second portion are out-of-phase, the recombined signal is directed along optical path 173. This is considered a drop condition for the MEMS interferometer 190.

The reflective layer 60 is moved to create interference that either adds or subtracts the first and second portions of the split signal. Adding the split portions acts to pass the signal through the MEMS interferometer, while subtracting the split portions acts to drop the signal. In this manner, the MEMS interferometer acts as a miniature Michelson interferometer using a MEMS device. For each component wavelength signal, there is a corresponding MEMS interferometer such that each signal can either be dropped or passed through the OADM. It is understood that the same effect can be obtained by shortening the optical path length 202 by a quarter wavelength $\lambda/4$ of the component signal.

Figure 10:
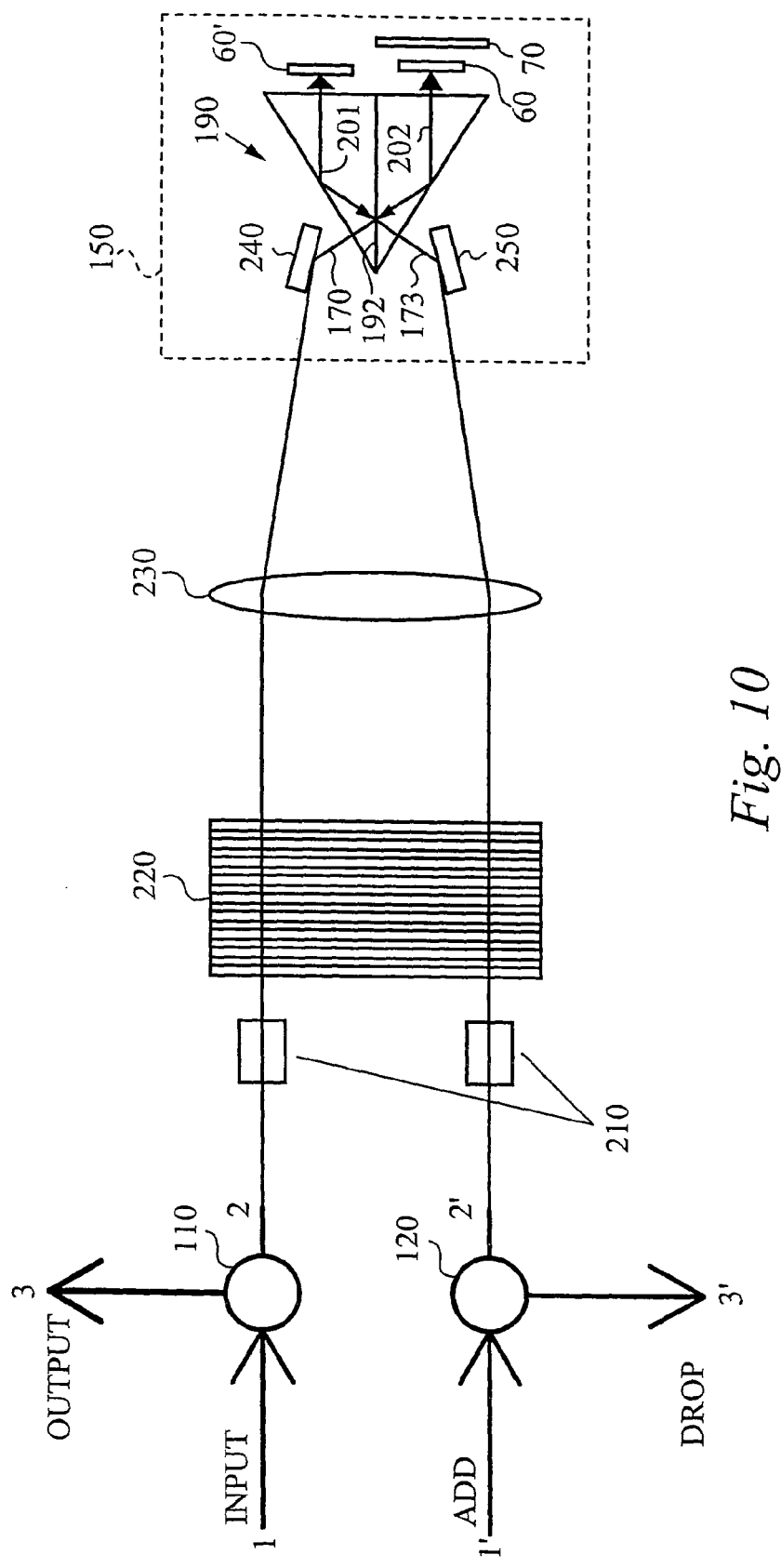
FIG. 10 illustrates an optical add-drop multiplexer (OADM) according to an embodiment of the present invention.

FIG. 10 illustrates an optical add-drop multiplexor (OADM) according to a first and preferred embodiment of the present invention. The OADM of the present invention de-multiplexes and directs each component wavelength signal of a OADM signal to a phase modulator array for dropping or passing each component signal. Where component signals are dropped, new signals can be added by de-multiplexing an add WDM signal comprising component wavelength signals to be added. The component signals to be added are then directed to the phase modulator array to be added into the same channels in which components signals were dropped. The phase modulator array uses a plurality of MEMS interferometers to perform the pass and drop functionality. Each MEMS interferometer is preferably a tunable Michelson interferometer using MEMS device.

The function of the OADM illustrated in FIG. 10 is identical to that described in relation to FIG. 5. However, the implementation in FIG. 10 uses free-space optics and a diffraction grating to decompose the WDM signal INPUT into its component wavelength signals and to direct the component signals to a corresponding MEMS interferometer 190 within the phase modulator array 150.

The WDM signal INPUT is directed out of port 2 by the circulator 110 to a polarization diversity module 210. The INPUT WDM signal is directed from the polarization diversity module 210 to a diffractive grating 220 to de-multiplex the INPUT WDM signal into its component wavelength signals. As illustrated in FIG. 10, only a single component wavelength signal is shown. The remaining component signals are diffracted at different angles coming out of the page. Similarly, the phase modulator array 150 only illustrates the single component wavelength signal impinging one of the MEMS interferometers 190. The entire phase modulator array 150 lies perpendicular to the page and each MEMS interferometer within the phase modulator array 150 receives a corresponding one of the component wavelength signals. To reduce complexity, the single component wavelength signal is described, although it should be clear that the described principles and functionality apply equally to all component wavelength signals.

The component signal is directed to the corresponding MEMS interferometer 190 by a transform lens 230 and a mirror 240. A single transform lens can be used for all component signals. The mirror 240 directs the component signal along the optical path 170. Preferably, a single mirror is used for all component signals, although a separate mirror can be used for each component signal. The MEMS interferometer 190 either passes or drops the component signal in the manner previously described. If the component signal is dropped, the component signal is directed along the optical path 173 to a mirror 250 that directs the component signal to the transform lens 230. The transform lens 230 directs the component signal to the diffractive grating 220 where the component signal and all other dropped component signals are re-multiplexed as a WDM signal DROP. The WDM signal DROP is directed into the port 2' of the circulator 120 via another polarization diversity module 210. The circulator 120 directs the WDM signal DROP out of the DROP port 3'.

A WDM signal ADD is directed out of the port 2' by the circulator 120 to the polarization diversity module 210. The WDM signal ADD includes component wavelength signals to be added in place of the component wavelength signals that are dropped from the WDM signal INPUT. The ADD WDM signal is directed from the polarization diversity module 210 to the diffractive grating 220 to de-multiplex the ADD WDM signal into its component wavelength add signals. As illustrated in FIG. 10, only a single component wavelength add signal is shown. This single component add signal corresponds to the same wavelength as the single component wavelength signal shown impinging the MEMS interferometer 190. The remaining component add signals are diffracted at different angles coming out of the page. Similarly to above, the phase modulator array 150 only illustrates the single component wavelength add signal impinging one of the MEMS interferometers 190. The component add signal is directed from the diffractive grating 220 by the transform lens 230 to the mirror 250. The mirror 250 directs the component add signal along the optical path 173. As previously described, the MEMS interferometer 190 adds the component add signal when in the out-of-phase condition.

All passed component signals and all added component add signals are back to the diffractive grating 220 via the transform lens 230. The diffractive grating re-multiplexes the passed component signals and the added component signals into a WDM signal OUTPUT. The WDM signal OUTPUT is directed to the port 2 of the circulator 110 by the polarization diversity module 210. The circulator 110 directs the WDM signal OUTPUT out the OUTPUT port 3.

In this manner, each component wavelength signal is either passed or dropped by the OADM. Depending on the position of the reflective layer within the MEMS interferometer, the component wavelength signal is either directed towards the OUTPUT port 3 or the DROP port 3'. Concurrently, when component signals are dropped, new signals at the same wavelengths as the dropped signals can be added.

Figure 11:
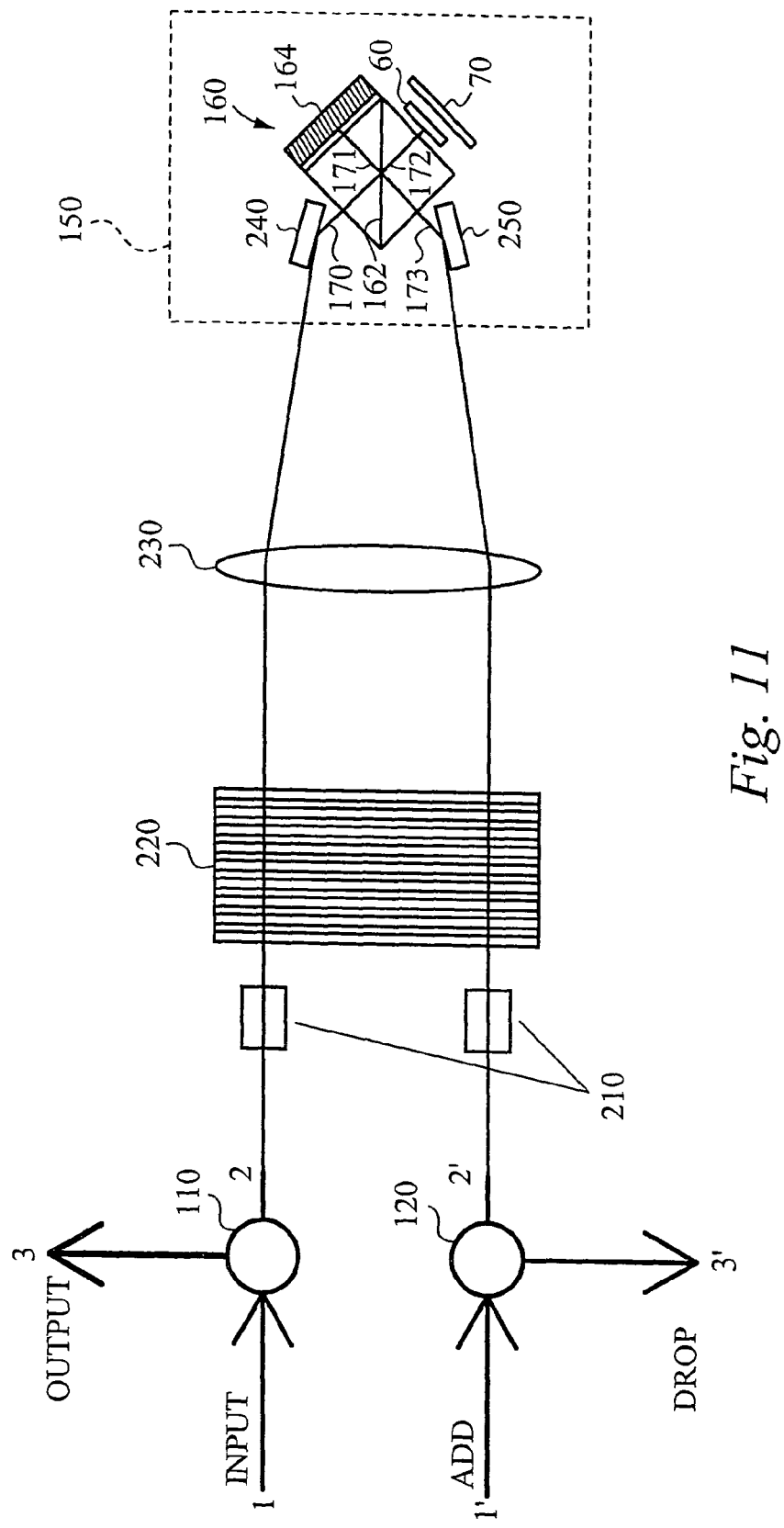
FIG. 11 illustrates an optical add-drop multiplexer (OADM) according to an embodiment of the present invention.

FIG. 11 illustrates an optical add-drop multiplexor (OADM) according to a second embodiment of the present invention. The OADM illustrated in FIG. 11 is identical to the OADM illustrated in FIG. 10 except that the phase modulator array 150 in FIG. 11 includes the MEMS interferometers 160 instead of the MEMS interferometers 190. The second embodiment of the OADM as illustrated in FIG. 11 functions similarly to the first embodiment of the OADM as illustrated in FIG. 10 and described above.

It will be readily apparent to one skilled in the art that other various modifications may be made to the preferred embodiment without departing from the spirit and scope of the invention as defined by the appended claims.

We claim:

1. An apparatus for selectively passing and dropping first component signals of a first wavelength division multiplexed (WDM) signal and for selectively adding second component signals of a second WDM signal to the first WDM signal, the apparatus comprising:
   a. a first optical train to direct each component signal of the first WDM signal along a corresponding one of a plurality of first optical paths;
   b. a second optical train to direct each component signal of the second WDM signal along a corresponding one of a plurality of second optical paths;
   c. an array of interferometers configured to receive the first component signals along the plurality of first optical paths and the second component signals along the plurality of second optical paths, each interferometer including a beam splitter to receive a first signal along the first optical path and a second signal along the second optical path, and to split each signal into a first portion and a second portion, a first mirror to reflect the first portion of each signal wherein an optical path length of the first portion is fixed, a phase modulator including a selectively actuated reflective layer to reflect the second portion of each signal wherein an optical path length of the second portion is variable, the phase modulator including a support structure and a substrate, the reflective layer forming a single elongated element suspended above the substrate, the reflective layer being configured to deflect in a direction substantially normal to the substrate;
   a first de-multiplexer configured to de-multiplex the first WDM signal into the first component signals, a second de-multiplexer configured to de-multiplex the second WDM signal into the second component signals;
   a first multiplexer configured to multiplex all first and second component signals directed back along the first optical path and a second multiplexer configured to multiplex all first and second component signals directed back along the second optical path;
   wherein the first de-multiplexer and the second de-multiplexer each comprise a diffraction grating configured to direct a component signal to a corresponding beam splitter by way of a transform lens and a second mirror;

whereby the reflective layer is selectively actuated between a first position and a second position to vary the optical path length of the second portion such that when the reflective layer is in the first position, the first portion and the second portion of the first signal constructively interfere and the first portion and the second portion of the second signal constructively interfere thereby directing the first signal back along the first optical path and the second signal back along the second optical path, and when the reflective layer is in the second position, the first portion and the second portion of the first signal destructively interfere and the first portion and the second portion of the second signal destructively interfere thereby directing the first signal along the second optical path and the second signal along the first optical path.

2. The apparatus according to claim 1, wherein the first multiplexer and the first de-multiplexer comprise a bi-directional multiplexer/de-multiplexer and the second multiplexer and the second de-multiplexer comprise a bi-directional multiplexer/de-multiplexer.

3. The apparatus according to claim 1 wherein the first optical train and the second optical train are comprised of free-space optics including a polarization diversity module on each input port of the apparatus.

4. The apparatus according to claim 1 wherein the first portion and the second portion are both reflected back to the beam splitter, and the first portion and the second portion are recombined at the beam splitter.

5. The apparatus according to claim 4 wherein the first portion and the second portion return to the beam splitter in-phase when the reflective element is in the first position.

6. The apparatus according to claim 4 wherein the first portion and the second portion return to the beam splitter 180 degrees out-of-phase when the Reflective layer is in the second position.

7. The apparatus according to claim 1 further comprising a controller electrically coupled to each phase modulator within the array of interferometers to provide control signals for selectively actuating the reflective layer within each phase modulator.

8. The apparatus according to claim 1 wherein the difference between the optical path length in the first position and the second position is one-quarter wavelength of the first signal.

* * * * *